US012409353B2

(12) United States Patent
Steingass et al.

(10) Patent No.: US 12,409,353 B2
(45) Date of Patent: Sep. 9, 2025

(54) TELESCOPING WATERWAY WITH INTEGRATED VALVE

(71) Applicant: TASK FORCE TIPS, LLC, Valparaiso, IN (US)

(72) Inventors: Robert W. Steingass, Valparaiso, IN (US); Alexander C. Yovanovich, Valparaiso, IN (US); David J. Kolacz, Plymouth, IN (US); Erin L. Roark, Valparaiso, IN (US); Kent A. Kekeis, St. John, IN (US)

(73) Assignee: TASK FORCE TIPS, LLC, Valparaiso, IN (US)

( * ) Notice: Subject to any disclaimer, the term of this patent is extended or adjusted under 35 U.S.C. 154(b) by 793 days.

(21) Appl. No.: 17/721,194

(22) Filed: Apr. 14, 2022

(65) Prior Publication Data

US 2022/0331629 A1 Oct. 20, 2022

Related U.S. Application Data

(60) Provisional application No. 63/175,295, filed on Apr. 15, 2021.

(51) Int. Cl.
*A62C 31/28* (2006.01)

(52) U.S. Cl.
CPC .................................... *A62C 31/28* (2013.01)

(58) Field of Classification Search
CPC ......... A62C 37/09; A62C 31/28; A62C 35/68; A62C 99/009; F16K 35/06; Y10T 70/5619; F16L 37/413
See application file for complete search history.

(56) References Cited

U.S. PATENT DOCUMENTS 5,188,185 A * 2/1993 Mears .................... A62C 37/09
169/37

* cited by examiner

*Primary Examiner* — Reinaldo Sanchez-Medina
*Assistant Examiner* — Nicole Gardner
(74) *Attorney, Agent, or Firm* — MARSHALL, GERSTEIN & BORUN LLP

(57) ABSTRACT

A telescoping waterway component for use in firefighting equipment has a multi-piece outer tube and a telescoping inner tube through which fluid flows. An inlet component is selectively positionable at different inlet heights along the outer tube and can be positioned to provide different inlet angles. A rotating shutoff element is mounted within a manifold of the inlet component. The inner tube can be retracted to nest within a hollow cross-section of the shutoff element when that element is closed. A valve interlock disables an operator from rotating the shutoff element while the inner tube is retracted, or from retracting the inner tube while the shutoff element is open.

9 Claims, 50 Drawing Sheets

TELESCOPING WATERWAY WITH INTEGRATED VALVE

BACKGROUND OF THE INVENTION

The disclosure relates to telescoping waterways used in firefighting equipment, of the general type described in U.S. Pat. No. 7,059,539. In particular, such waterways are used for adjusting the height of a firefighting monitor.

SUMMARY OF THE DISCLOSURE

A telescoping waterway arrangement for use in firefighting equipment is disclosed. The arrangement includes a hollow outer tube and a hollow inner tube within the outer tube. The structure of the disclosed embodiment of the telescoping waterway arrangement:

1. Provides a flow path to deliver water or another firefighting fluid agent to a firefighting monitor.
2. Provides structural support between the outer tube and the inner tube while the telescoping waterway is extended, most critically when the firefighting monitor is discharging fluid into the atmosphere, causing a reaction force on the telescoping waterway.
3. Provides at least one travel stop in at least one extended position of the moving inner tube such that supplying the device with the rated operating pressure should not cause the inner tube to separate from the outer tube.
4. Provides a means of nesting the inner tube within the hollow outer tube, enabling the axial distance to be reduced for transport and/or storage.

Specifically, the applicant has developed a telescoping waterway component that has:

- a manifold that forms part of a waterway;
- a rotating shutoff element that rotates about an axis with respect to the manifold between open and closed positions;
- a telescoping inner tube that forms part of the waterway and moves between a) an extended position that is downstream of the manifold and b) a retracted position in which the inner tube nests within a hollow cross-section of the rotating shutoff element when that element is in its closed position;
- an inlet component that can be mounted at different angles with respect to the telescoping waterway, enabling the waterway component to be arranged so that fluid can flow into the waterway in either a straight or bent path; and
- a multi-piece outer tube that forms part of the waterway and connects to the manifold in different configurations, enabling the component to be arranged with the inlet component at different heights along the waterway.

DETAILED DESCRIPTION

Telescoping waterways enable the stream of firefighting equipment such as a firefighting monitor to clear obstructions on their mounting platform or truck. For manual monitors, a secondary benefit is that the system moves the monitor's vertical and horizontal controls for the stream orientation to a height that is more ergonomically suitable for the operator. A taller extension height enables the monitor to use a lower discharge angle. A lower angle can enable a firefighter to aim the stream more directly at the target, which could even be located below horizontal in some situations. This can occur when, for example, the stream is being sprayed from a roadway that is elevated above the fire. To reach distant targets, increased discharge height can also be beneficial to increase the horizontal reach of the monitor at a given discharge angle, such as at the typical optimal discharge angle of 32° above horizontal.

Shortcomings of Existing Designs

The height of existing telescoping waterway components often prevents those components from being optimally specified. Telescoping waterways are typically mounted in a pump compartment within a firefighting vehicle, and require waterway plumbing, mechanical linkages, etc., for connection within that space. A lack of space within the pump compartment of a particular firefighting vehicle is sometimes a limiting factor for use of a telescoping waterway component.

As a specific example, in some vehicles, an 18" extension range would be optimal to enable the monitor to be used with an optimal three-dimensional range of discharge direction. However, space constraints in the pump compartment of those vehicles can limit the use of conventional waterway systems to those having a telescoping waterway with no more than a 12" extension. Those space constraints prevent those systems from being specified at the optimal extension height for those vehicles, or from being specified for those vehicles at all.

The inlet location of existing telescoping waterways is also often not ideal for the design of some firefighting vehicles. It is typical for fire engine pump compartments to contain waterway plumbing and mechanical operator controls for eight or more discharge outlets. In addition, it is common for a lateral hose bed (known as a cross-lay) to encroach on the pump compartment space from directly above. Thus, it is challenging to route sixteen or more components such that they do not interfere with each other.

Figure 6A:
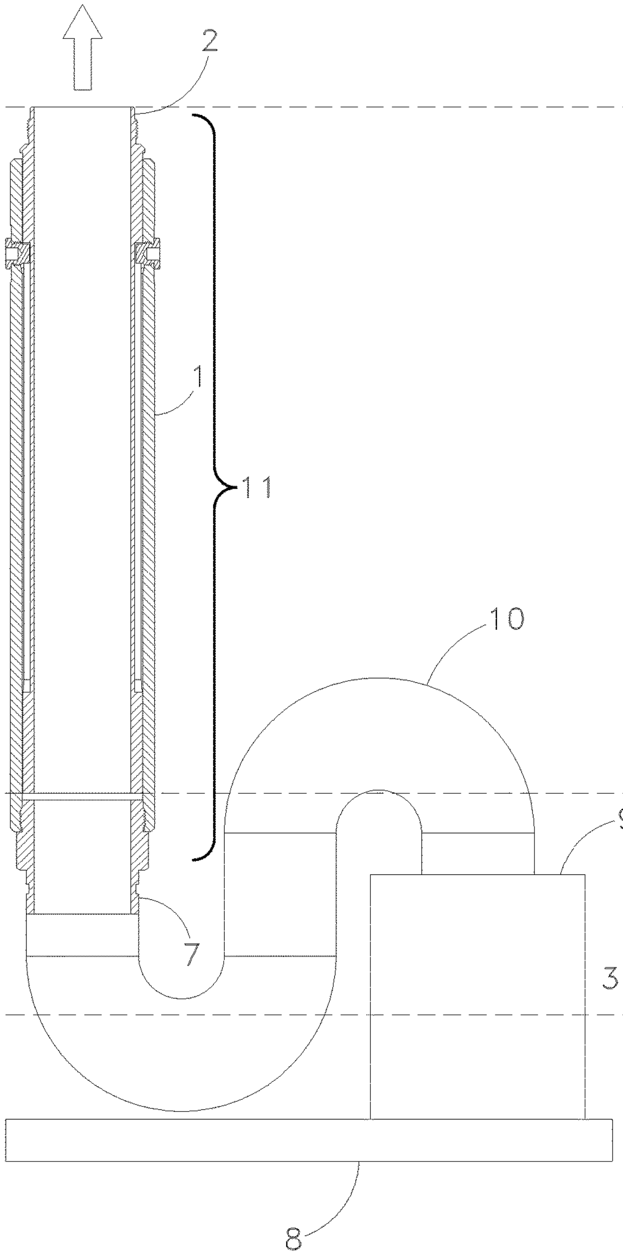
Fig.6A Prior Art

Every known existing telescoping waterway has an inlet at a fixed location at the bottom of the waterway that is oriented coaxially with the waterway. In some cases, the bottom of the telescoping waterway is necessarily located at a height equal to or lower than the height of the upstream valve that is connected to the pump outlet. In other cases, the telescoping waterway axis is offset horizontally from the pump outlet. As seen in FIG. 6A, these situations typically require two opposing 180° bends (10), e.g., an "S"-shaped routing of plumbing to be fabricated and installed between the pump (8) and the valve (9) (on one hand) and a connection inlet (7) on the telescoping waterway (11). The inclusion of two opposing 180° bends in these cases may limit the possible extension height of the telescoping waterway and may impact the ability to route other components through the pump compartment of the vehicle.

If an operator extends a telescoping waterway while it contains pressure from the pump, there can be a risk of equipment damage. To mitigate this risk, some existing telescoping waterways include a safety latch that prevents extension from the fully retracted position when pressure from the pump is present within the telescoping waterway. Though this type of latch design addresses the concern in the fully retracted position, it does not prevent the telescoping waterway from being pressurized while they are at an intermediate height between the fully retracted height and the fully extended height.

Benefits of Some of the Disclosed Arrangements

Figure 1A:
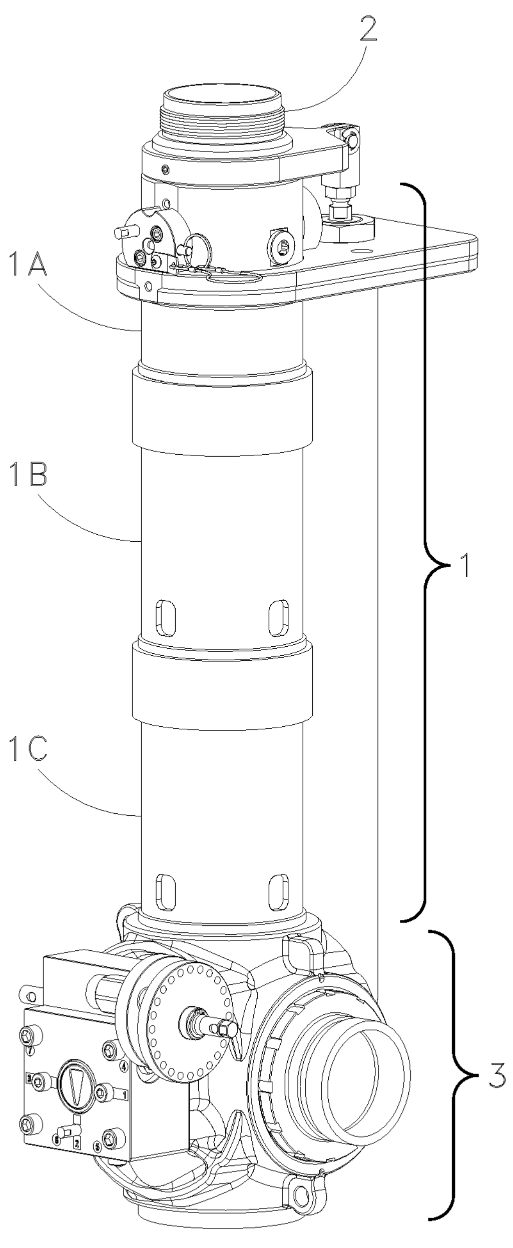
FIGS. 1A and 1B are isometric views of one embodiment of a manifold that includes a rotating shutoff element that is nested around the inner tube of the telescoping waterway.
Figure 1B:
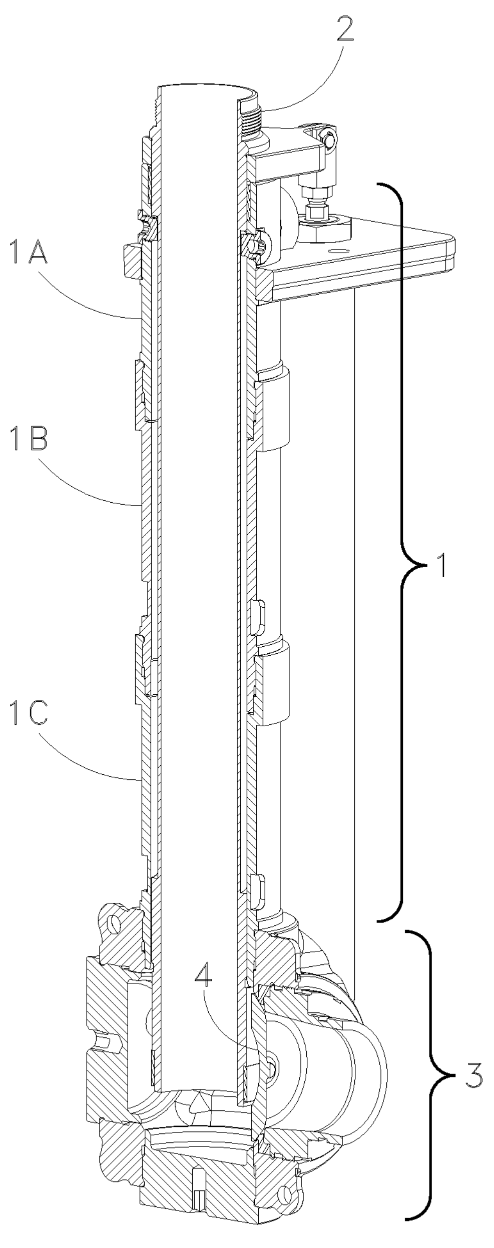

As seen in FIGS. 1A and B and 2A and B, the new arrangements shown here include a novel manifold (3) that is connected to an outer tube (1) formed of three segments (1A, 1B, and 1C). These components, along with an inner tube (2) that telescopes within the outer tube together form a telescoping waterway. Incorporation of valve structure in the form of a rotating shutoff element (4) (discussed in more detail below) within the illustrated manifold (as seen in FIGS. 5B, 6B, and 7B) conserves height and space that would typically be occupied by a separate shutoff valve (9), as seen in the prior art arrangements of FIGS. 5A, 6A, and 7A. In the new arrangement, the valve is effectively mounted around the inner tube of the telescoping waterway, so that when the inner tube of the telescoping waterway is retracted, it nests within the manifold. This reduces the net height and space that would otherwise be required for installing a separate valve.

In a prior art setting using a 3" diameter flow path and a manual worm gear drive, it would be common to employ a ball valve that is 4" long (along the flow path) by 9.1" along the rotational axis by 6.9" wide across the inlet and outlet bolt patterns, as measured without any inlet or outlet connections. Adapting the outlet of such a valve to the typical 3" grooved fitting connection used for pipe between a valve and a telescoping waterway would require an additional 3.3" in length. In total, a typical prior art ball valve arrangement in this setting would require 7.3" length that is not required if the valve is nested around the inner tube of the telescoping waterway, as disclosed here.

Figure 5A:
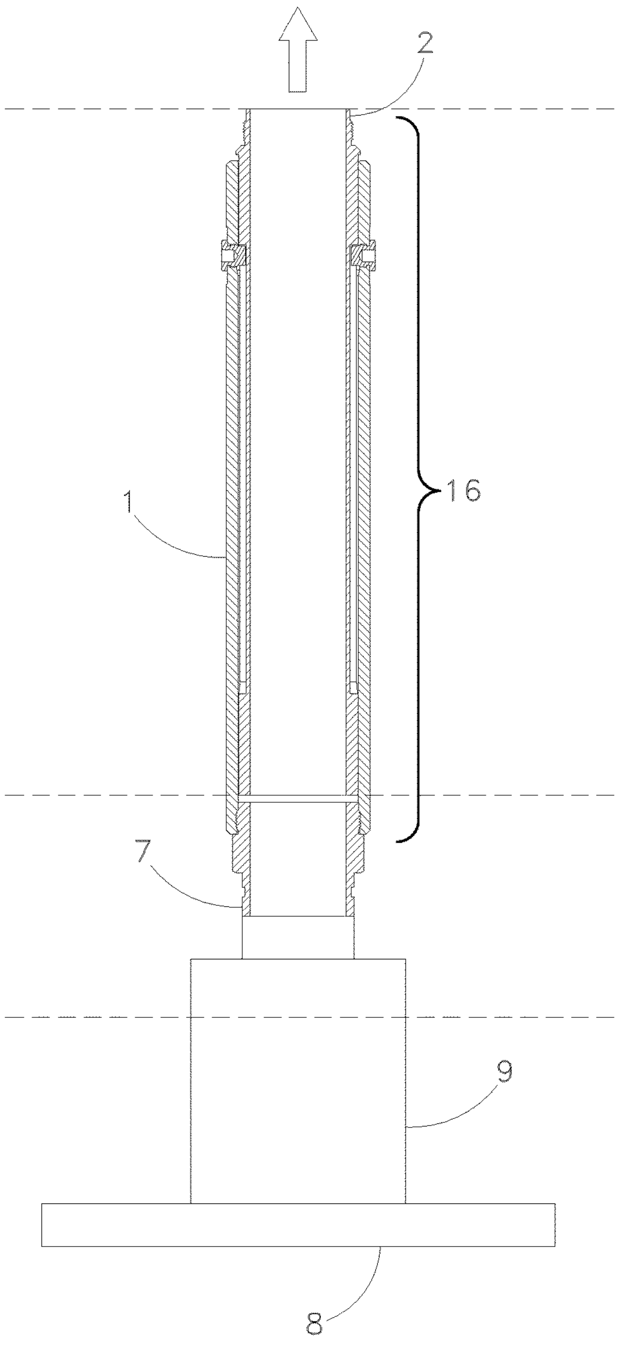
Fig.5A Prior Art
FIGS. 5A and B, 6A and B, and 7A and B are comparative cross-sectional views that illustrate how the new arrangement enables greater tube heights to be achieved and requires less space than prior designs.
Figure 5B:
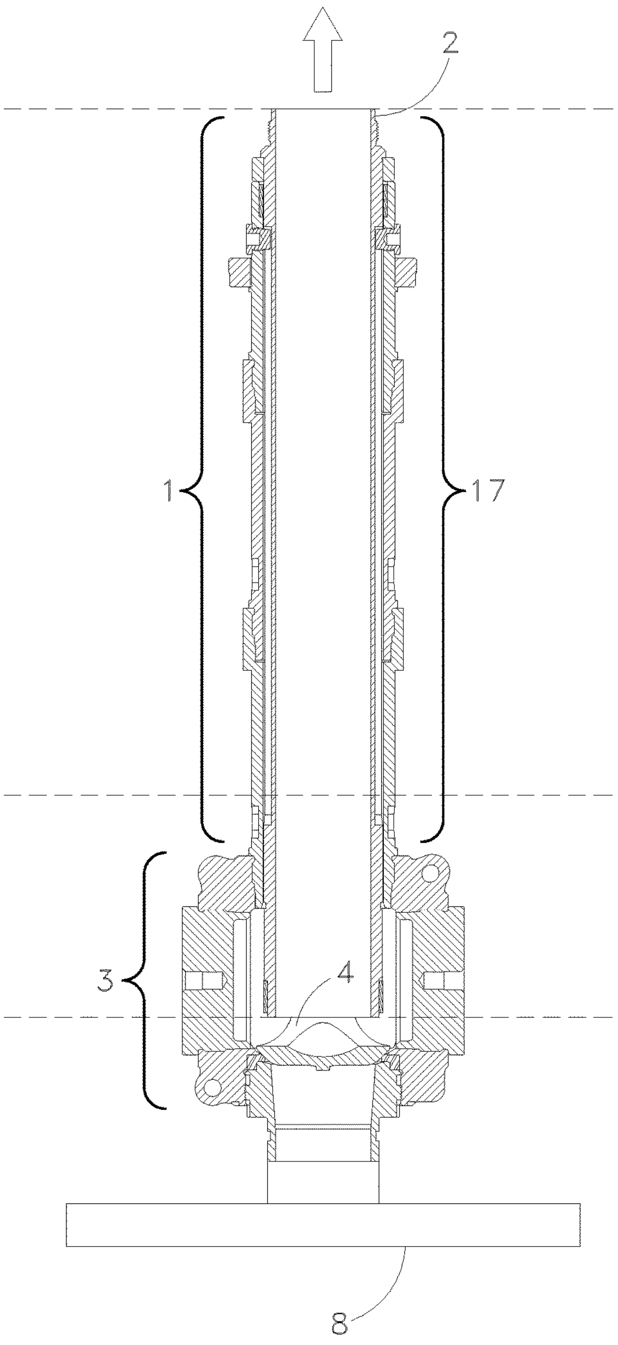
Figure 6B:
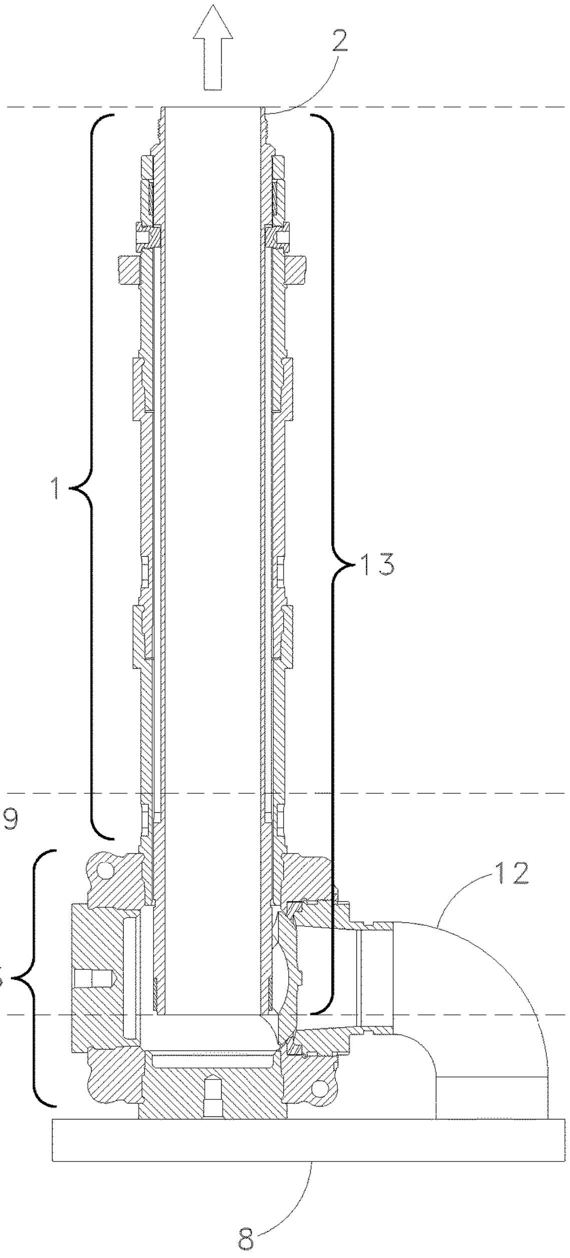

FIG. 5A shows a typical prior art telescoping waterway component that is mounted above a separate valve. The new arrangement seen in FIG. 5B includes the new shutoff element (4) integrated into the telescoping waterway. The overall heights of these two arrangements have been illustrated as equal for the sake of comparison. Nesting the inner tube (2) within the shutoff element (4) in the new manifold (3) enables a longer inner tube (2) to be used. In the disclosed setting, the inner tube of the new waterway component can be 22% taller than the tube in the prior art arrangement. The increased tube height permits greater extension of the waterway. The nesting can also be used to reduce the overall height of the telescoping waterway in the retracted position.

The configurable inlet component that is disclosed can provide an installer with connection options that may optimize the routing of components (such as waterway plumbing and operator controls). In some cases, the telescoping waterway must be coaxial with the pump outlet. In those situations, a coaxial inlet may be most favorable. In other cases, two opposing 180° bends of plumbing may be required for connection, presenting the space problem discussed above.

FIGS. 6A and B illustrate that configuring the connection inlet (6) of the new manifold (3) to be perpendicular to the axis of the telescoping waterway can enable the two opposing 180° bends (10) that are required in a prior art arrangement of FIG. 6A to be replaced in a new arrangement (seen in FIG. 6B) that requires only a single 90° bend (12). The overall heights of these two designs are again presented as equal for the sake of comparison. The single 90° bend requires only one quarter of the space within the pump compartment that two opposing 180° bends require.

A typical 90° elbow of 3" schedule 40 aluminum pipe has an O.D. of 3.5" and a centerline bend radius of 4.5". For bends of this geometry, a single 90° bend requires 204 cubic inches fewer of space than two opposing 180° bends. Actual space savings will vary based on the O.D. and bend radius of the piping chosen. For the overall height depicted, the new valve arrangement with a single 90° elbow enables a 28% increase in the height of the inner tube, which likewise increases the possible extended height. Again, the benefit can also be used to reduce the overall height of the telescoping waterway in the retracted position.

Figure 7A:
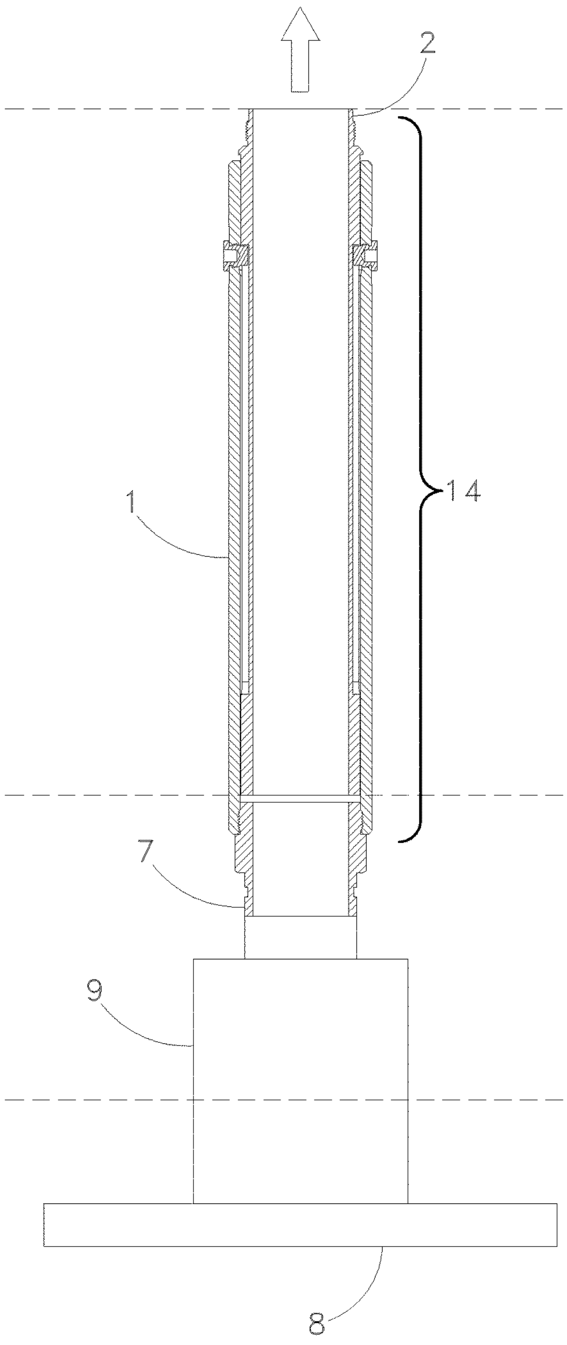
Fig. 7A Prior Art
Figure 7B:
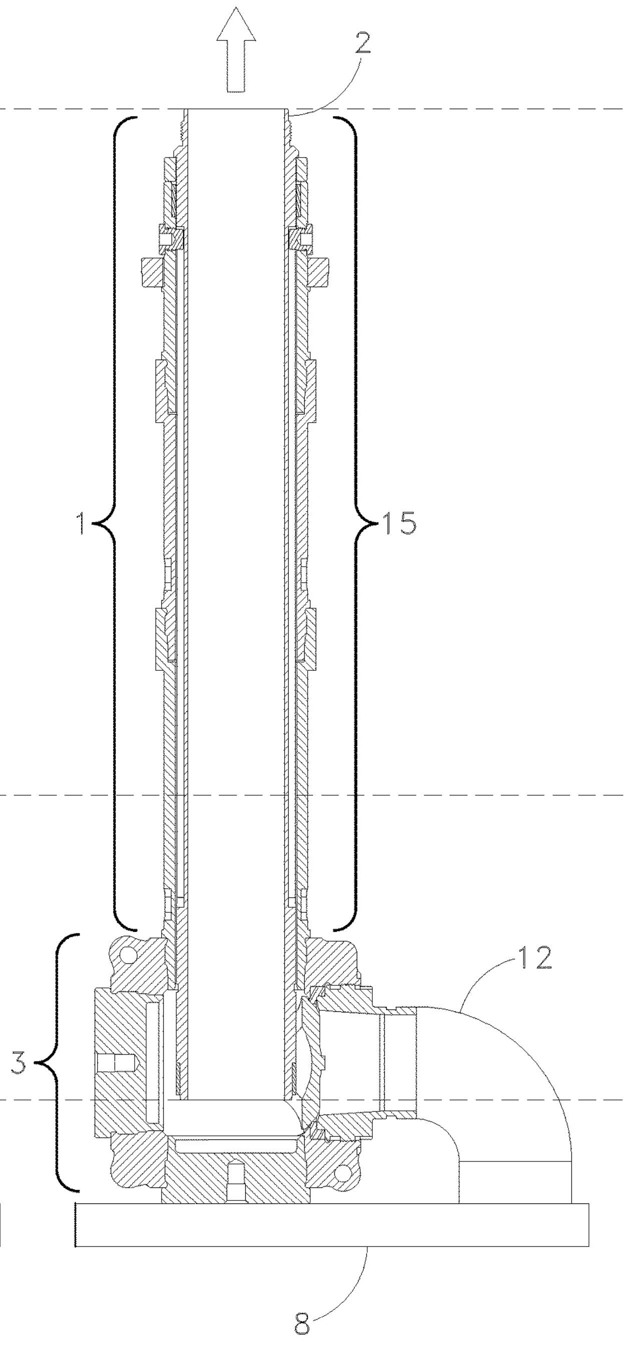

FIGS. 7A and B show FIG. 5A side-by-side with a taller iteration of FIG. 6B. Once again, the overall heights of the new arrangement (FIG. 7B) and a comparable prior art arrangement (FIG. 7A) are shown as equal for the sake of comparison. For the overall height depicted, the new arrangement with a single 90° elbow enables a 31% increase in the height of the inner tube, which likewise increases the possible extended height. Again, the benefit can also be used to reduce the overall height of the telescoping waterway in the retracted position.

Figure 8A:
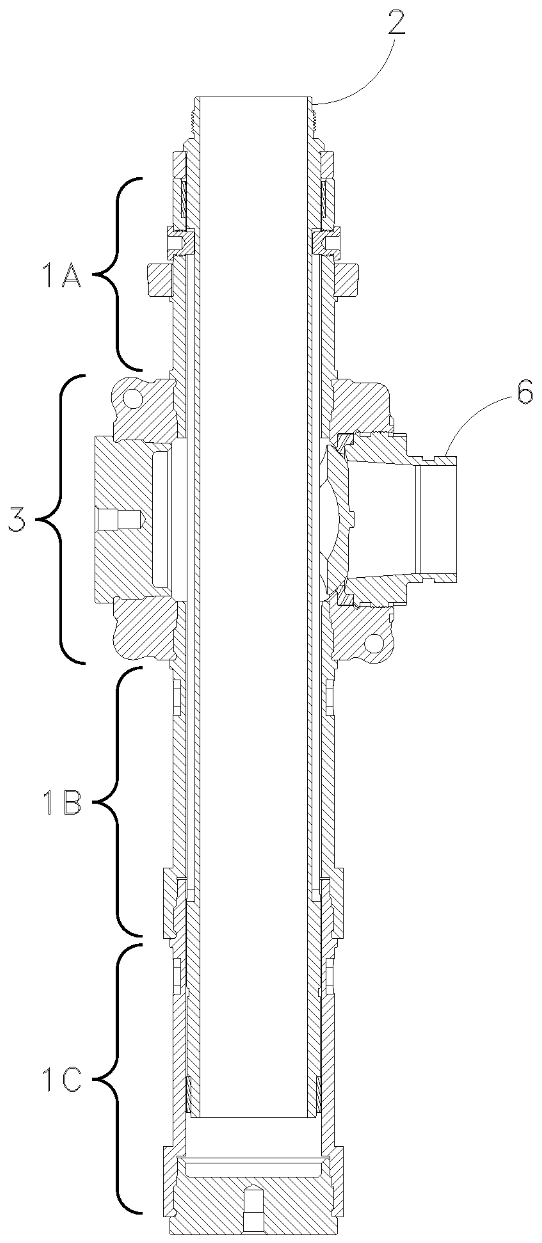
FIGS. 8A, B, and C are cross-sectional views of three alternative ways in which the same multi-tube components can be assembled to alter the inlet position.
Figure 8B:
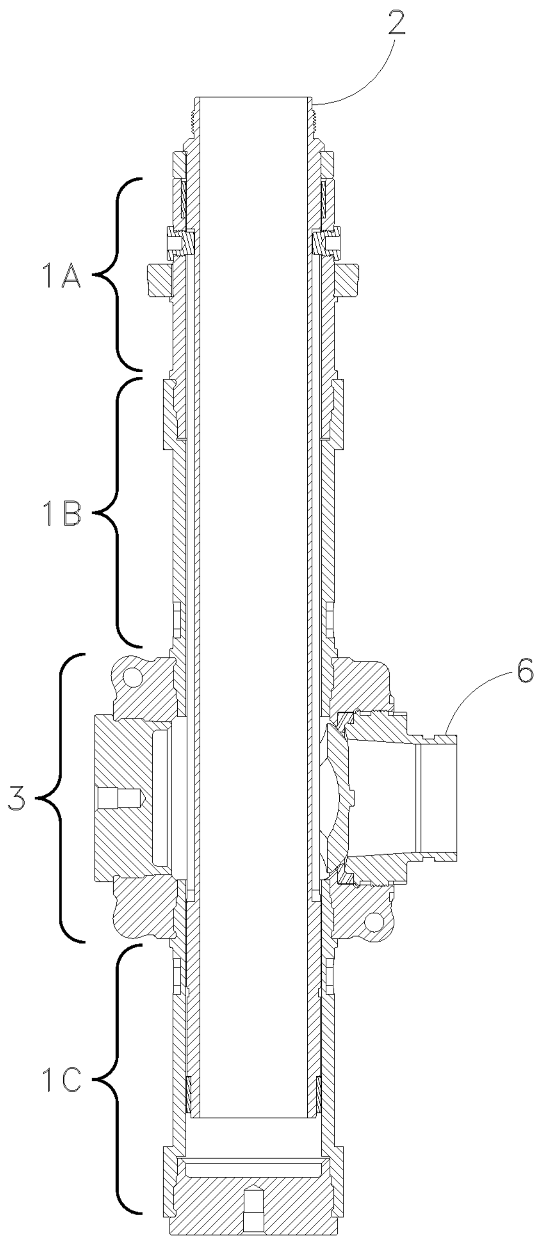
Figure 8C:
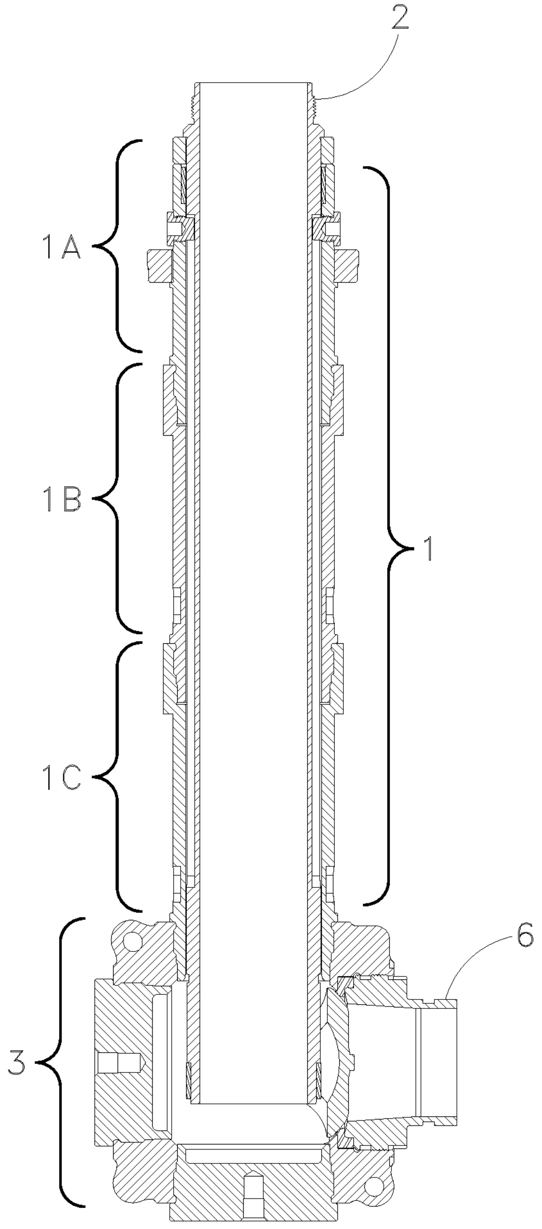

FIGS. 8A-C show three different ways in which a single set of components (the manifold (3), a terminal tube segment (1(A)), an intermediate tube segment (1(B)), and a third tube segment (1(C))) can be alternatively arranged to provide field-configurable options for the position of an connection inlet (6) on the manifold (3) along the height of the telescoping waterway. In FIGS. 8A-C, the manifold includes the rotating shutoff element that serves as a valve, but the intended configurable positions could alternately be achieved by employing a manifold that does not serve as a valve. In the example seen in FIG. 8A, only one of the tube segments is mounted above (downstream of) the manifold. In the example seen in FIG. 8B, two of the tube segments are mounted above the manifold, and in the example of FIG. 8C, all of the tube segments are mounted above the manifold. The different configurations place the inlet component at different positions along the height of the telescoping waterway.

This set of components provides an installer with options for installation geometry, enabling the installer to choose from among different inlet height options to optimize the routing of components. By enabling the inlet height to be altered, this new set of components enables an installer to optimize the routing of the other components, such as the mechanical controls for the discharge outlets.

A telescoping waterway requires a shutoff valve downstream from the pump to enable the top deck monitor to be used independently of other discharge outlets from the pump, such as those that supply hand line nozzles. Integrating the required valve into the telescoping waterway provides an opportunity to control the conditions under which the valve may be opened. The disclosed arrangement includes a new valve control latch that prevents the integrated valve from being opened—and thus the waterway from being pressurized—until the telescoping waterway is fully extended. This addresses the risk described above.

To accomplish this, a new telescoping waterway control interlock has also been developed. The interlock can be used to prevent the telescoping waterway from being retracted until the integrated valve is fully closed. This is consistent with the intended use of the product, and it can prevent the telescoping inner tube from colliding with the rotating shutoff element (4) within the manifold when the shutoff element is not in the fully closed position.

Embodiments of the New Design

The sections below discuss how the various new components can be incorporated into different configurations.

The Rotating Shutoff Element

Figure 2A:
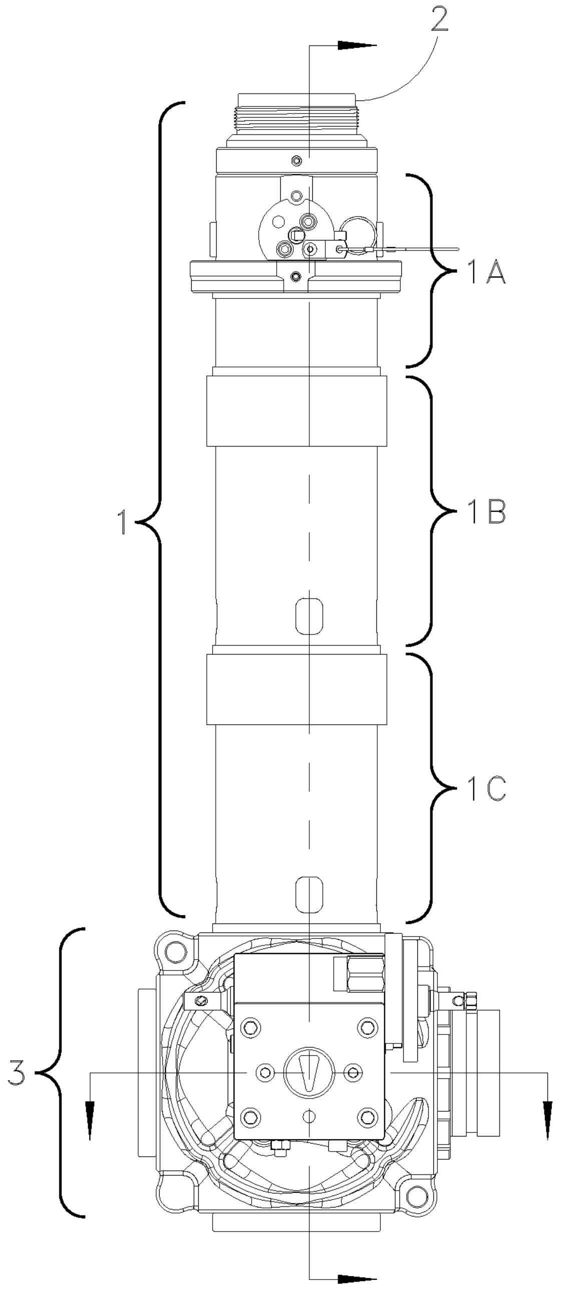
FIGS. 2A, 2B, and 2C are side and cross-section views of the arrangements seen in FIGS. 1A and 1B.
Figure 2B:
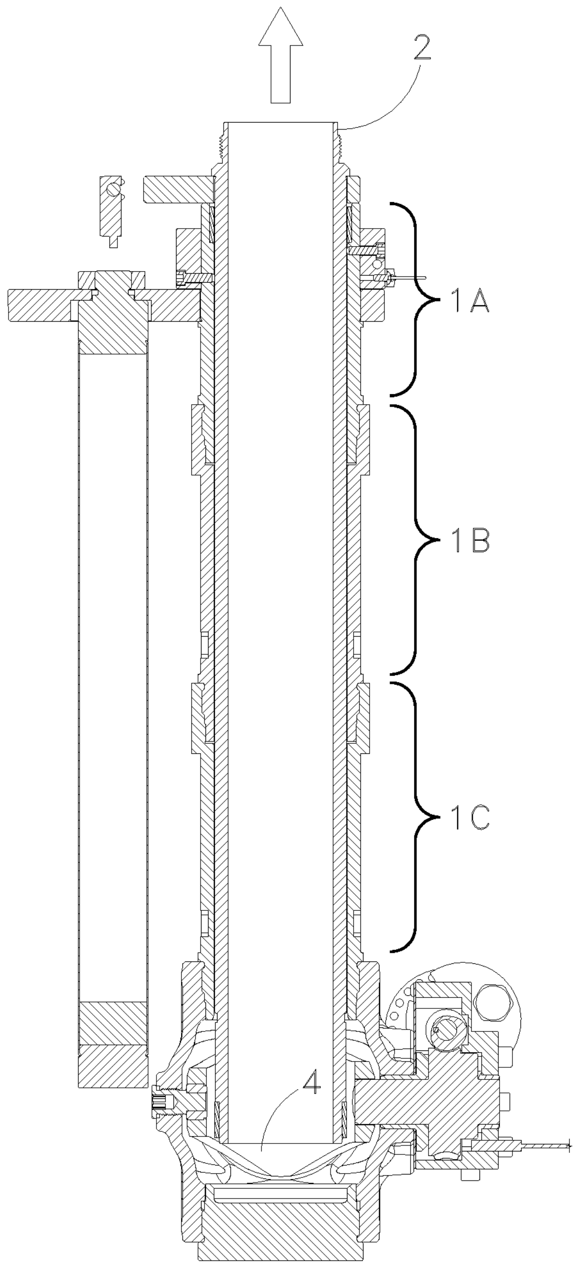
Figure 2C:
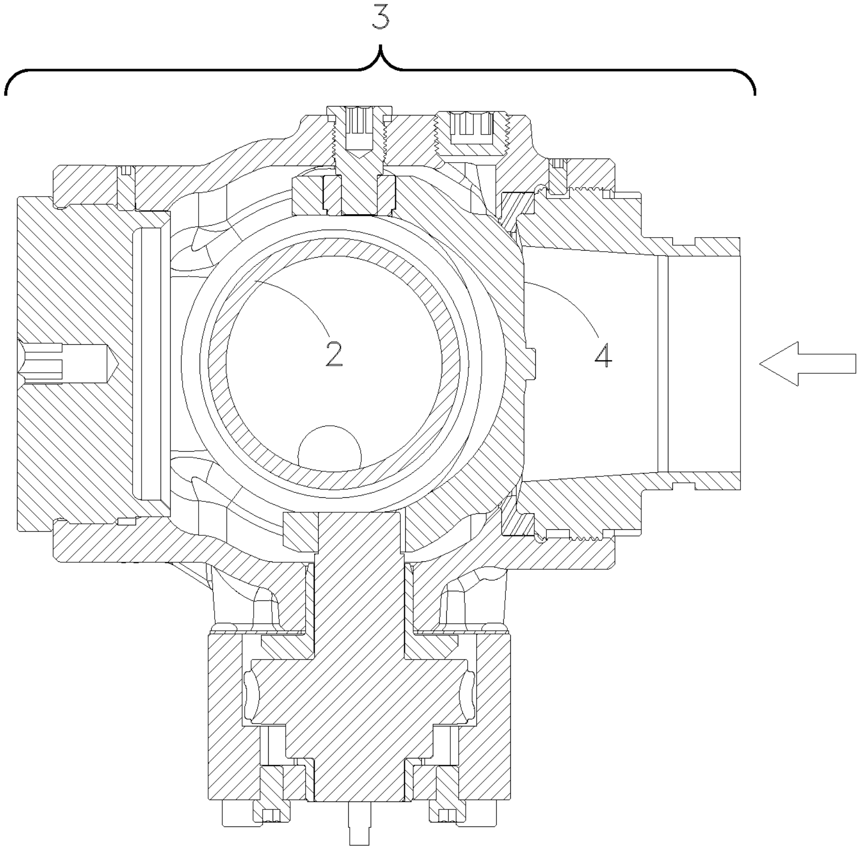

In a preferred embodiment seen in FIGS. 2B and C, the new device has a rotating shutoff element (4) that serves as a shutoff surface that is used to shut off flow through the waterway. This element can take a variety of forms.

The Shutoff Element of FIGS. 11A-D

The preferred arrangement seen in FIG. 11A-D uses an embodiment of the shutoff element (4) that is shaped roughly as a quarter segment of a sphere. The rotational axis (27) of the shutoff element may or may not pass through the center of the sphere. The location of the rotational axis will affect whether the valve operates as a conventional ball valve (if the axis passes through the center of the sphere) or as an eccentric plug valve (if the axis is offset from the center of the sphere. The difference in the position of the axis need not affect the described benefits. The shutoff element has an interior flow path surface (28) that has the form of a segment of a cylindrical surface that has a flow axis that is perpendicular to the rotational axis (27) of the shutoff element. Some additional material (29) is provided surrounding the rotational axis to form a mounting opening for shutoff element.

Figure 11A:
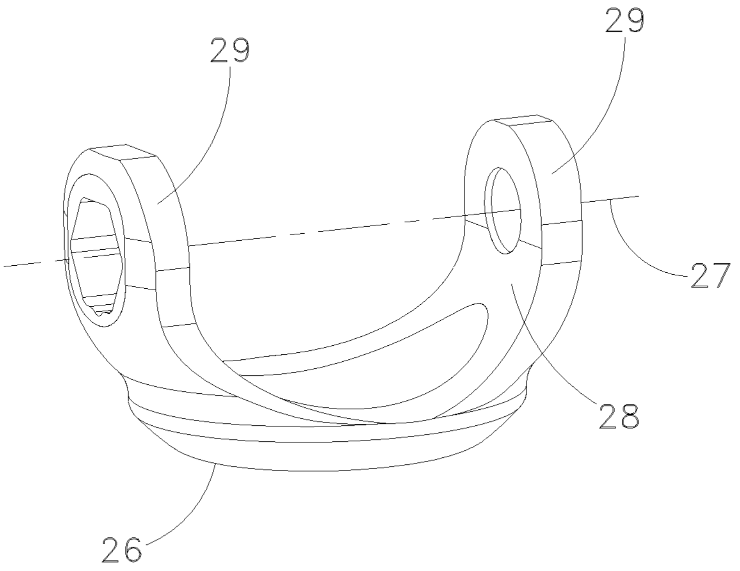
FIG. 11A is an isometric view of one embodiment of a rotating shutoff element.
Figure 11B:
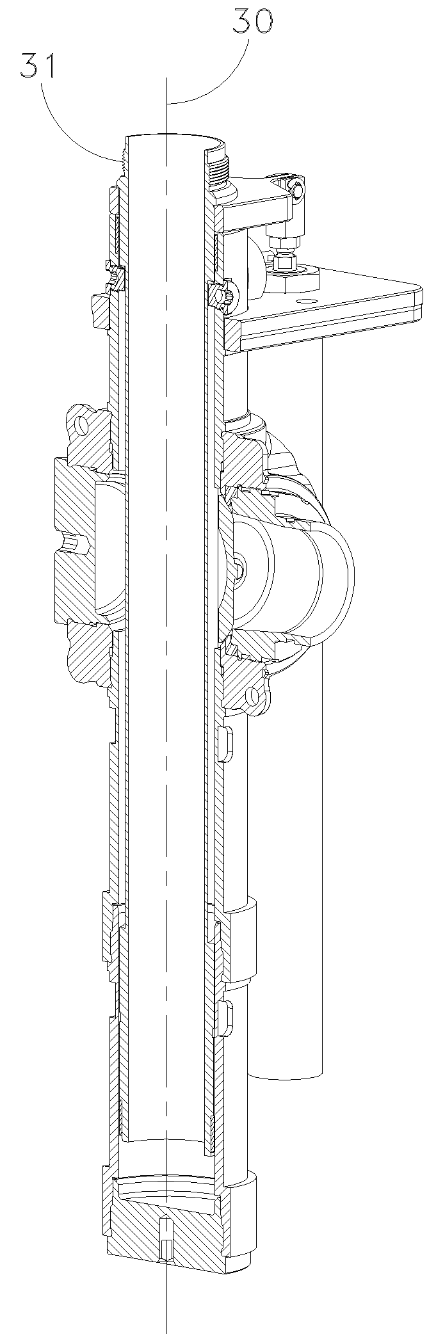
FIGS. 11B, C, and D are isometric views of an operating sequence of three positions of the telescoping waterway and shutoff element.
Figure 11C:
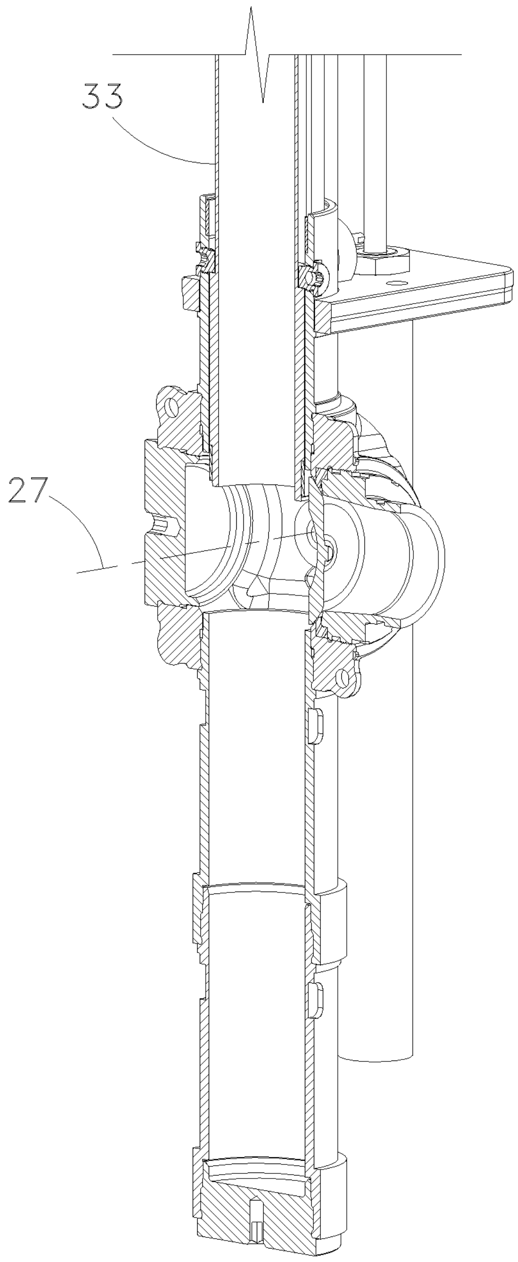
Figure 11D:
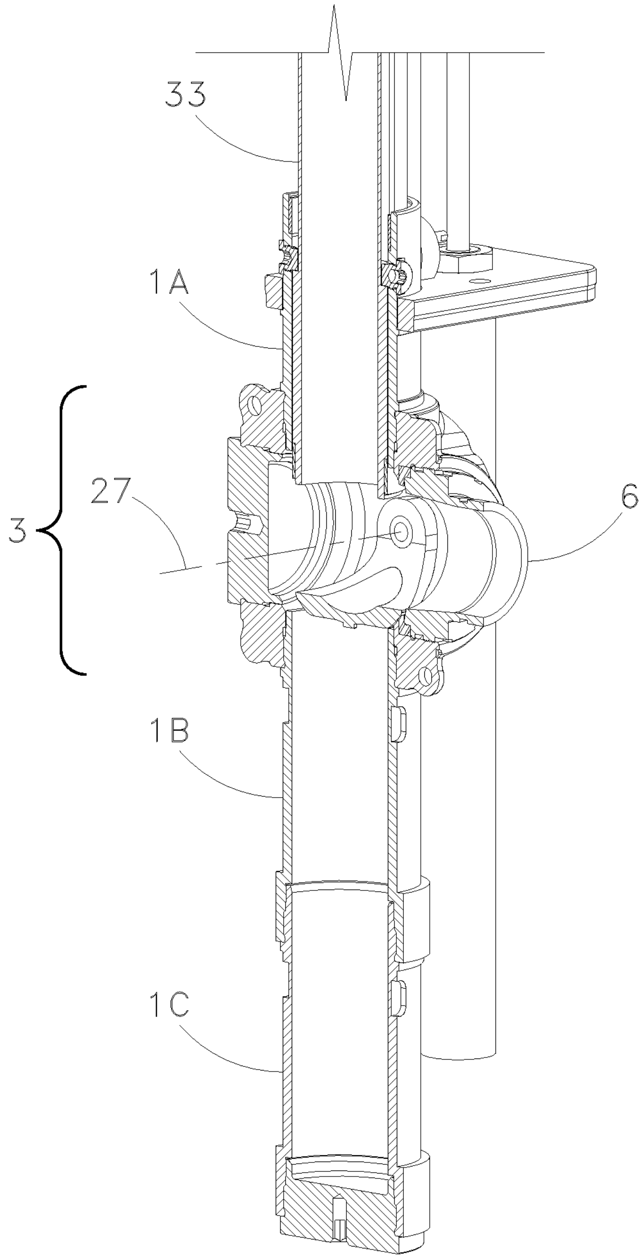

The shutoff element is mounted within the manifold (3) in a position where the rotational axis (27) of the element is perpendicular to the flow direction (30) of the telescoping waterway. When the shutoff element is closed, as seen in FIGS. 11B and C, the outer surface (26) of the shutoff element blocks the flow of fluid into the manifold. In that position, the inner tube (31) of the waterway is able to travel past and nest within the interior flow path surface (28) of the shutoff element. When the inner tube (33) is fully extended, as seen in FIGS. 11C and D, the rotating shutoff element can be rotated to the open position seen in FIG. 11D, moving the outer surface (26) out of its blocking position and aligning the interior flow path surface (28) with the walls of the waterway connection inlet (6) that lead to it. In this position, fluid can flow from the connection inlet into the inner tube (33) and then on to a connected monitor or nozzle for discharge.

In many cases, this arrangement can:

- minimize the height required for the arrangement, particularly when configured with a bottom inlet that is coaxial with the telescoping waterway;
- provide more options for routing other components; and
- enable the use of better safety controls.

The Shutoff Element of FIGS. 12A-D

The alternative embodiment seen in FIG. 12A-D, uses an embodiment of the rotating shutoff element (4) that is shaped essentially as a quarter segment of a cylinder. The shape of the outer surface (35) is the only notable difference from the preferred embodiment seen in FIG. 11A-D. This embodiment of a shutoff element also has an interior flow path surface (37) that has the form of a segment of a cylindrical surface that has a flow axis that is perpendicular to the rotational axis of the shutoff element. Again, some additional material (38) is provided surrounding the rotational axis to form a mounting opening for shutoff element.

Figure 12A:
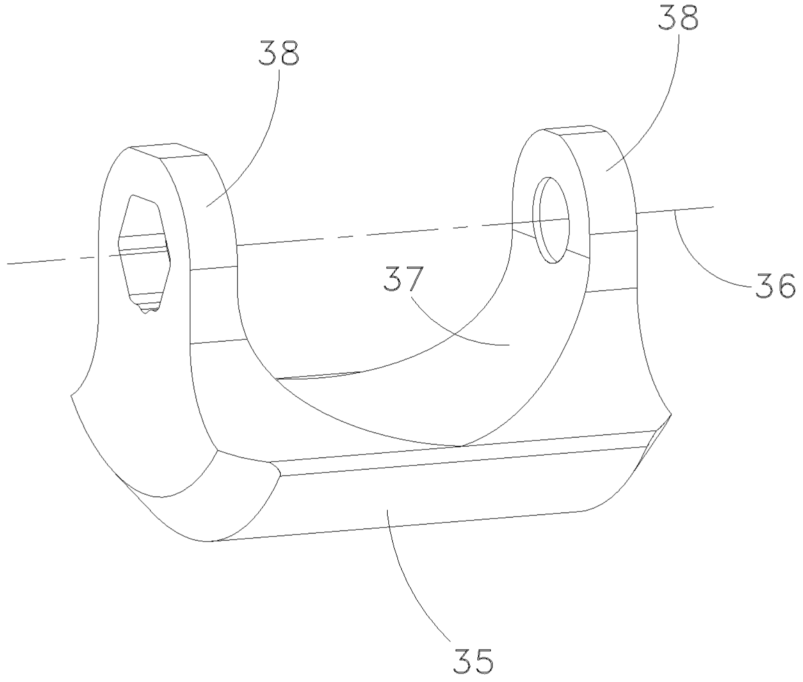
FIG. 12A is an isometric view of a second embodiment of a rotating shutoff element.
Figure 12B:
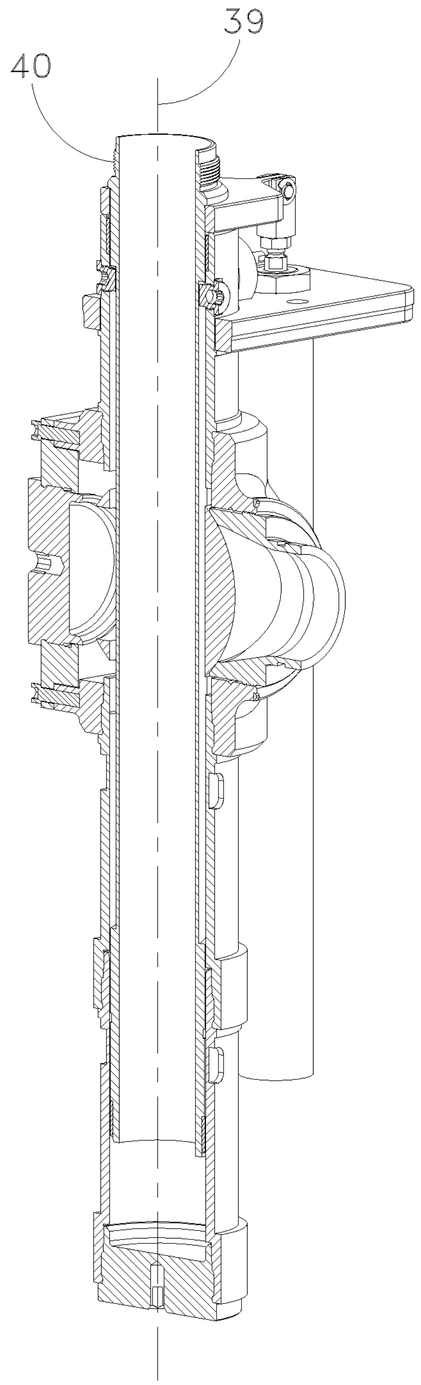
FIGS. 12B, C, and D are isometric views of an operating sequence of three positions of the telescoping waterway and the second embodiment of a rotating shutoff element.
Figure 12C:
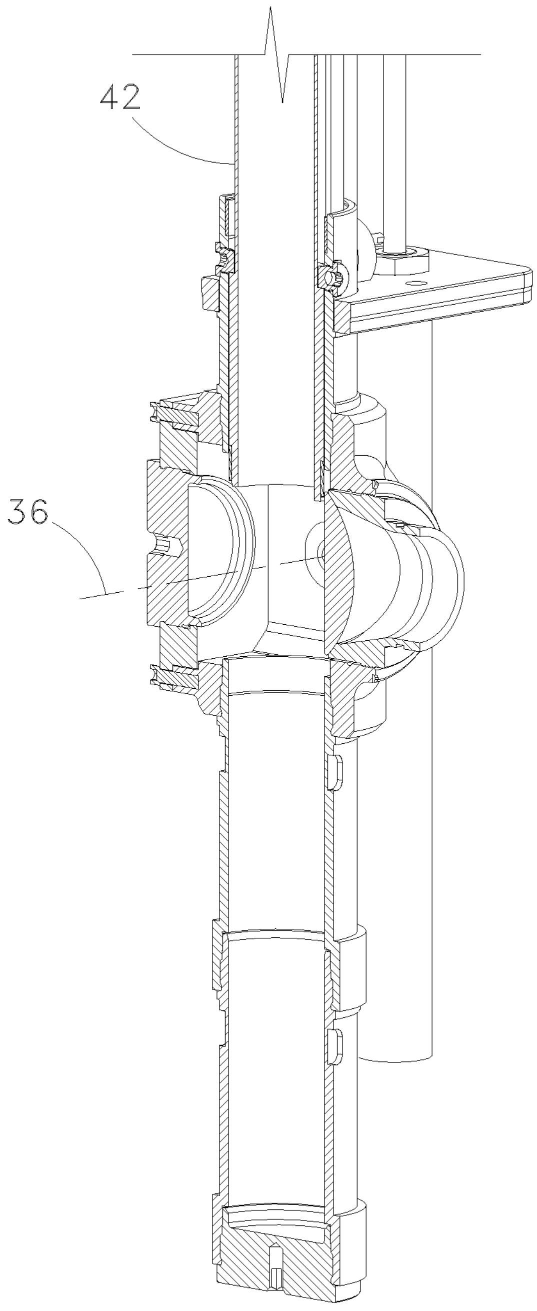
Figure 12D:
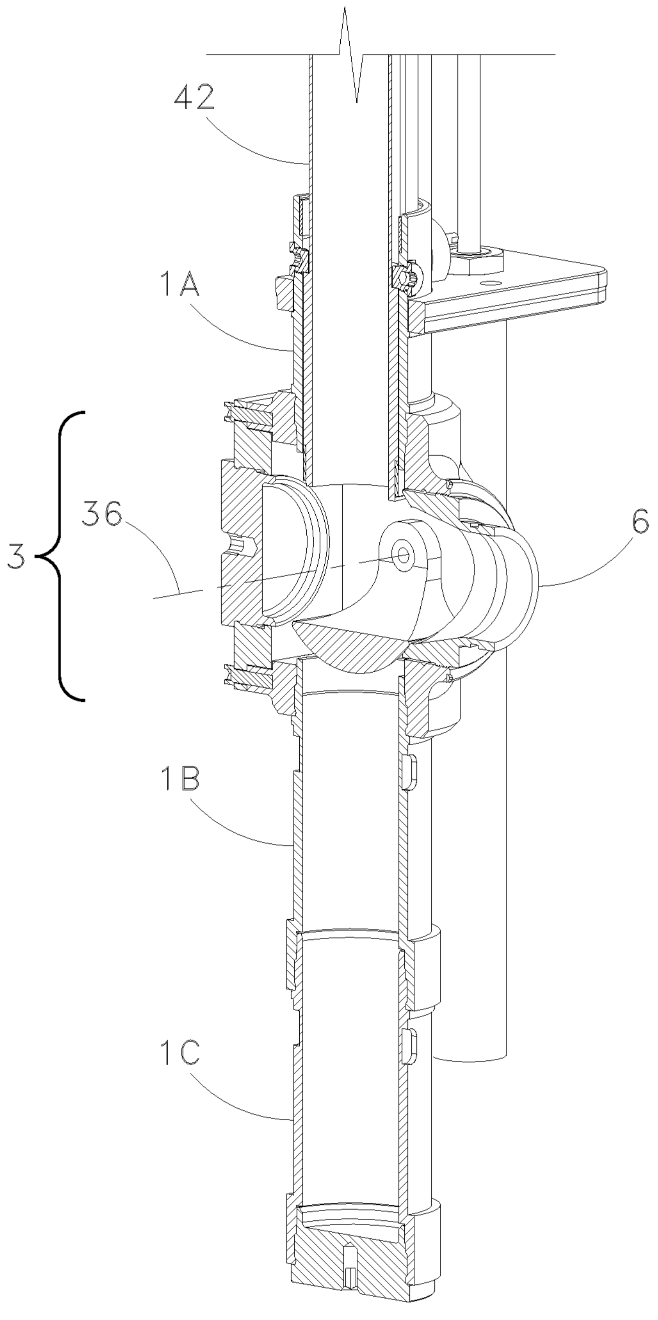

When the shutoff element is closed, as seen in FIGS. 12B and C, the outer surface (35) of the shutoff element blocks the flow of fluid into the manifold. In that position, the inner tube (42) of the waterway is able to travel past and nest within the interior flow path surface (37). When the inner tube (42) is fully extended, as seen in FIGS. 12C and D, the rotating shutoff element can be rotated to the open position seen in FIG. 12D, moving the outer surface (35) out of its blocking position and aligning the interior flow path surface (37) with the walls of the connection inlet (6) that lead to it.

In this position, fluid can flow from the connection inlet into the inner tube (42) and then on to a connected monitor or nozzle for discharge.

In many cases, this arrangement can:

minimize the height required for the arrangement, particularly when configured with a bottom inlet that is coaxial with the telescoping waterway;

provide more options for routing other components; and enable the use of better safety controls.

The Shutoff Element of FIGS. 13A-D

Another alternate embodiment illustrated in FIGS. 13A-D uses an embodiment of the rotating shutoff element (4) that is shaped as a sphere. Again, the rotational axis (45) of the sphere may or may not coincide with the center of the sphere. The location of the rotational axis will determine whether the valve operates as a conventional ball valve or as an eccentric spherical plug valve, which need not affect the described benefits. This embodiment of a shutoff element has a through hole (46) and a perpendicular blind hole (47) that intersects with it.

Figure 13A:
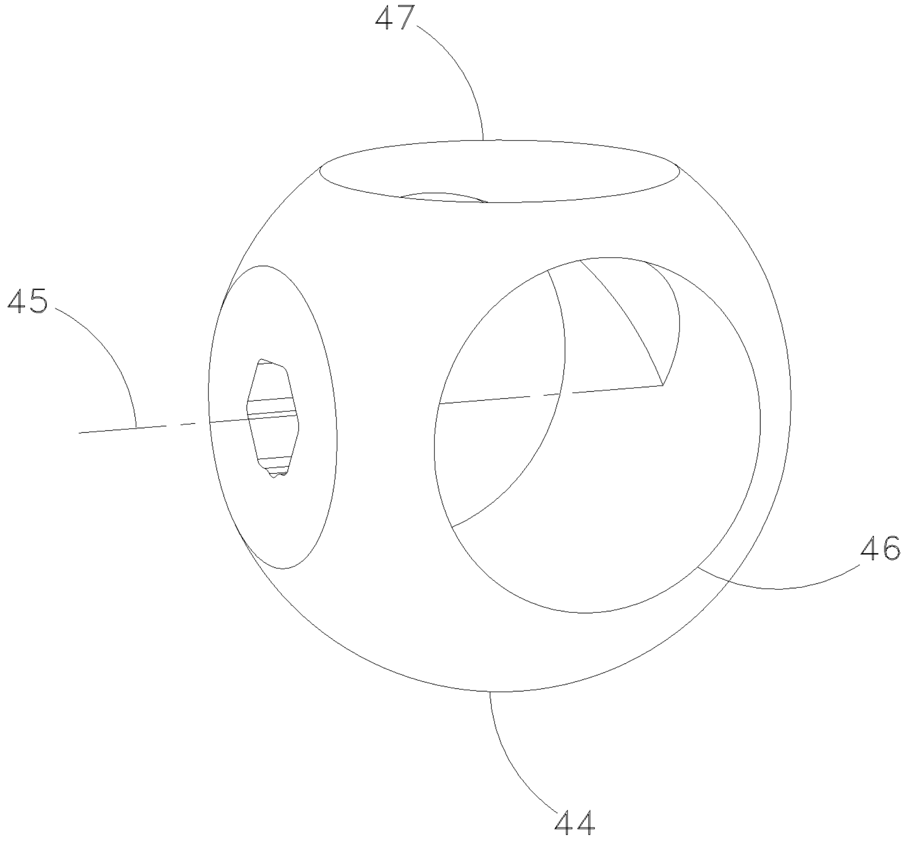
FIG. 13A is an isometric view of a third embodiment of a rotating shutoff element.
Figure 13B:
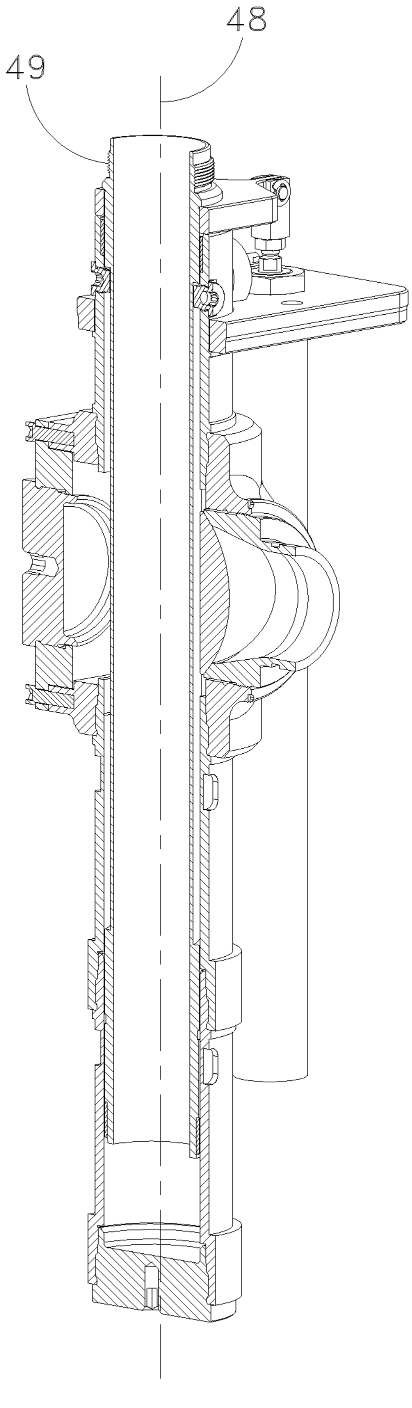
FIGS. 13B, C, and D are isometric views of an operating sequence of three positions of the telescoping waterway and the third embodiment of a rotating shutoff element.
Figure 13C:
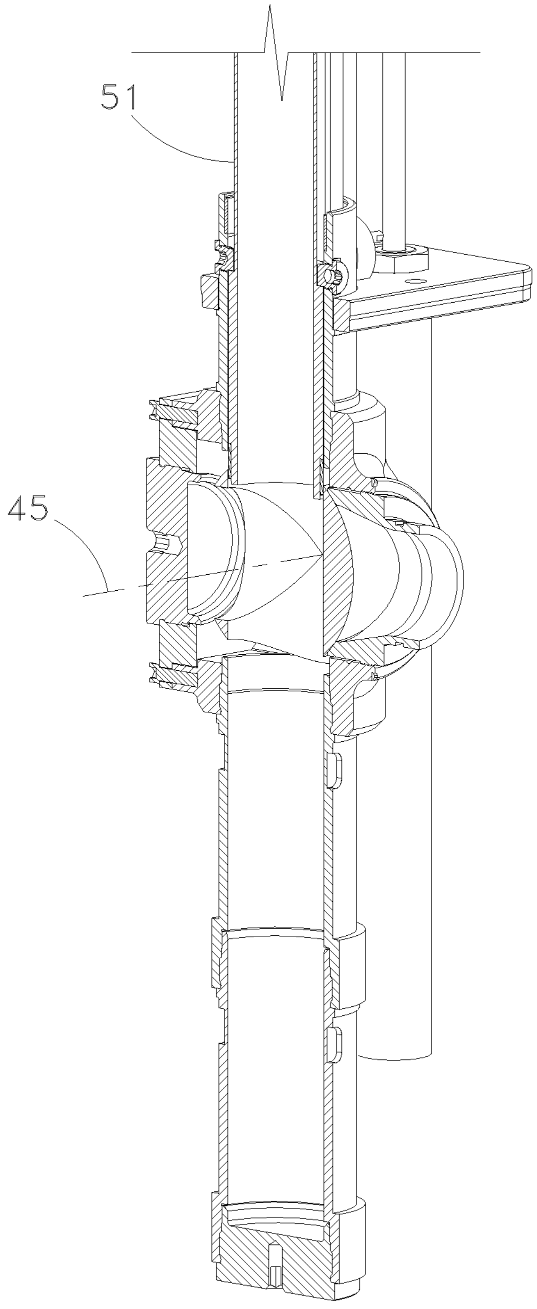
Figure 13D:
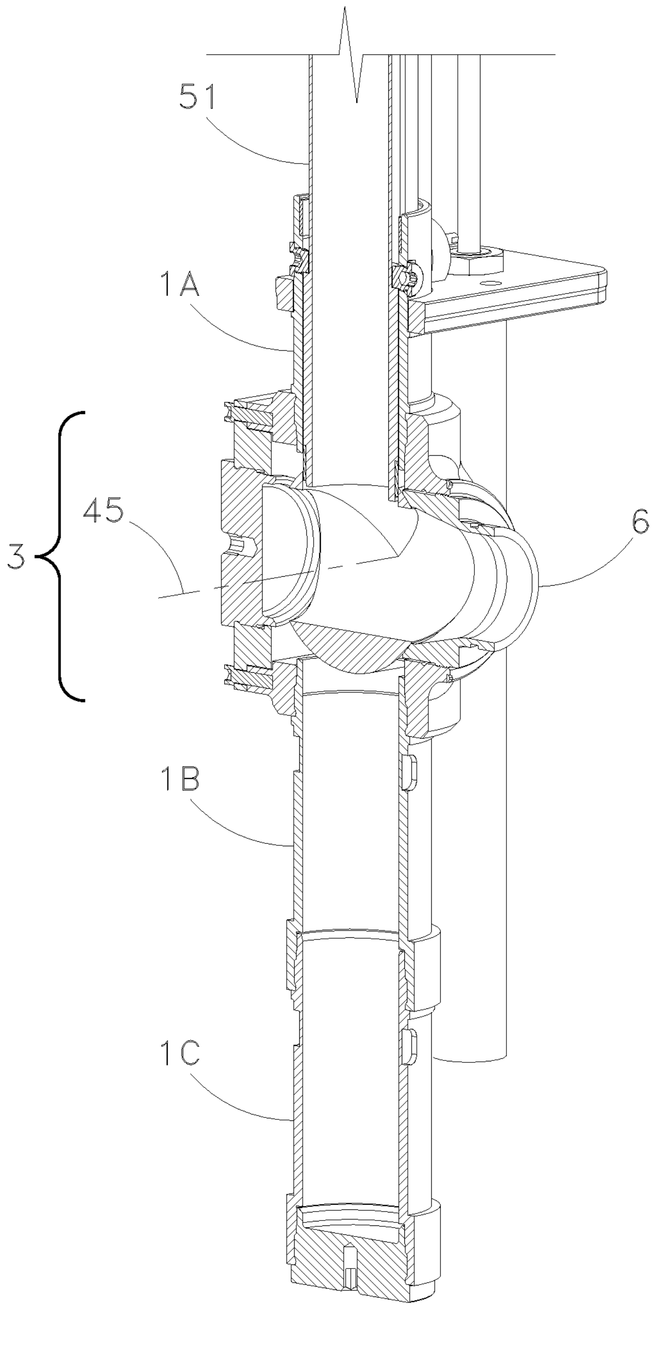

This shutoff element is again mounted within the manifold (3) in a position where the rotational axis (45) of the element is perpendicular to the flow direction (48) of the telescoping waterway. When the shutoff element is closed, as seen in FIGS. 13B and C, the outer surface (44) of the shutoff element blocks the flow of fluid into the manifold. In that position, the inner tube (51) of the waterway is able to travel past and nest within the through hole (46) in the shutoff element. When the inner tube (51) is fully extended, as seen in FIGS. 13C and D, the rotating shutoff element can be rotated to the open position seen in FIG. 13D, moving the outer surface (44) out of its blocking position and aligning the through hole (46) with the walls of the connection inlet (6) that lead to it. In this position, fluid can flow from the connection inlet and, through the blind hole (47), into the inner tube (51) and then on to a connected monitor or nozzle for discharge.

In this orientation, the end of the cylindrical through-hole is not needed for fluid flow, so it would be feasible for that end to be closed if the inlet component is located in the lowest position (e.g., FIG. 8C). However, closing one end of the cylindrical through-hole would limit the extent of nesting that is feasible and would prohibit configuring the inlet component at different positions along the height of the waterway.

Figure 3A:
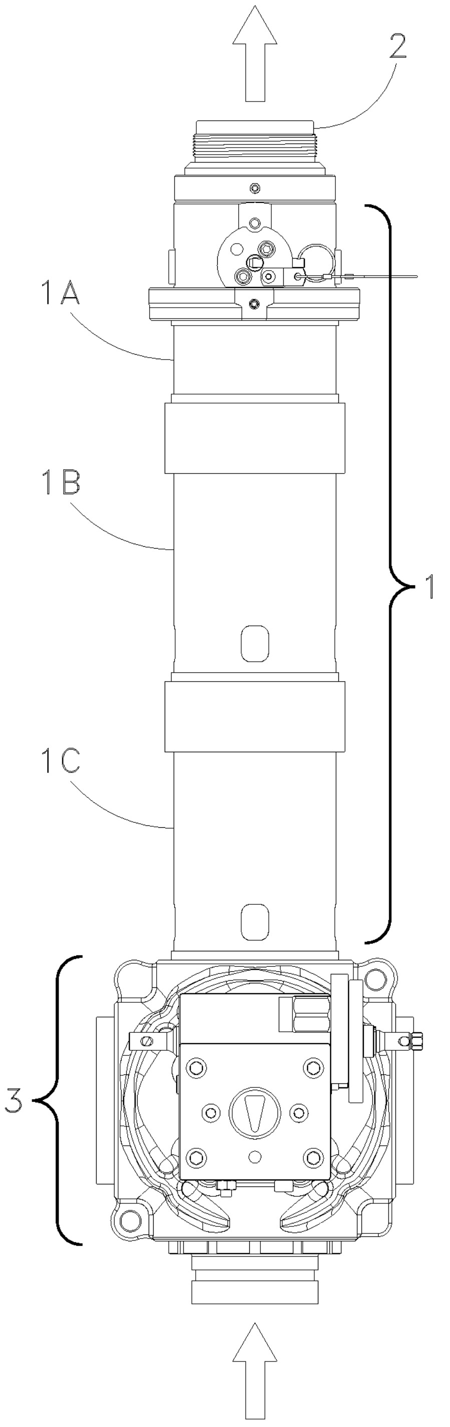
FIGS. 3A and 3B are side views of two alternative ways in which the same manifold can be mounted in a telescoping waterway.
Figure 3B:
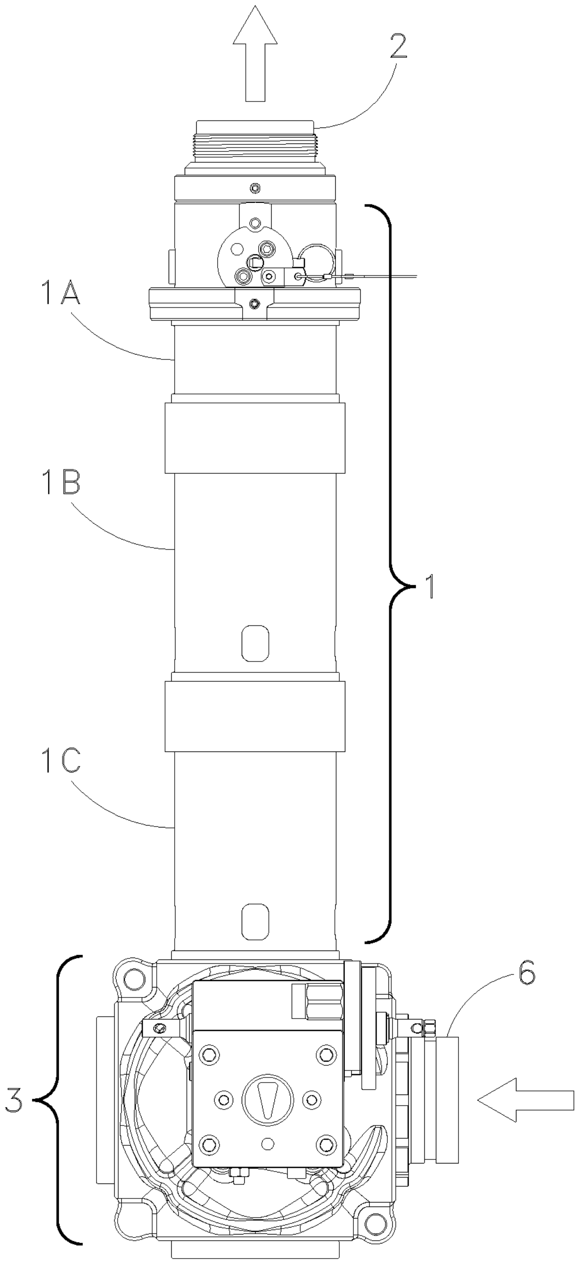

For configurations in which the connection inlet is positioned parallel to the telescoping axis (48) (e.g., FIG. 3A), the inner tube nests within the blind hole (47).

The spherical shutoff element of this embodiment occupies more space than the shutoff element of preferred valve embodiment 1A, and thus requires a larger manifold component as well.

Nonetheless, In many cases, this arrangement can:

reduce the height required for the arrangement, particularly when configured with a bottom inlet that is coaxial with the telescoping waterway;

provide more options for routing other components; and enable the use of better safety controls.

A spherical (or similar) shutoff element could also be configured with a single cylindrical through-hole, and no blind hole. Such an arrangement would only function efficiently in cases where the connection inlet is parallel to the telescoping axis (e.g., FIG. 4A). Similarly, a spherical shutoff element could be configured with a single L-shaped hole, but such an arrangement would only function efficiently in cases where the waterway inlet is perpendicular to the telescoping axis, and the possible nesting would be less than in an arrangement with a T-shaped opening like the one seen in FIG. 13A.

The Shutoff Element of FIGS. 14A-D

The alternate embodiment seen in FIGS. 14A-D includes an embodiment of the rotating shutoff element (4) in the form of a full cylinder. The shape of the outer surface (53) is the only notable difference from the embodiment seen in FIGS. 13A-D. This embodiment of a shutoff element also has a through hole (55) and a blind hole (56).

Figure 14A:
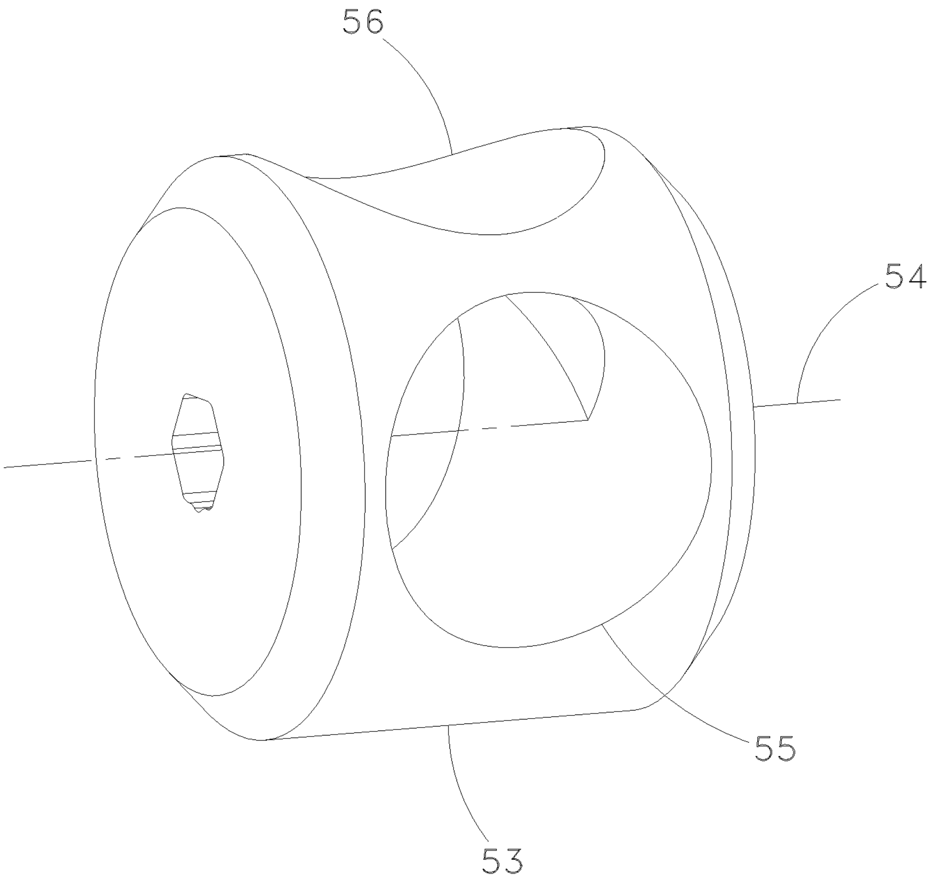
FIG. 14A is an isometric view of a fourth embodiment of a rotating shutoff element.
Figure 14B:
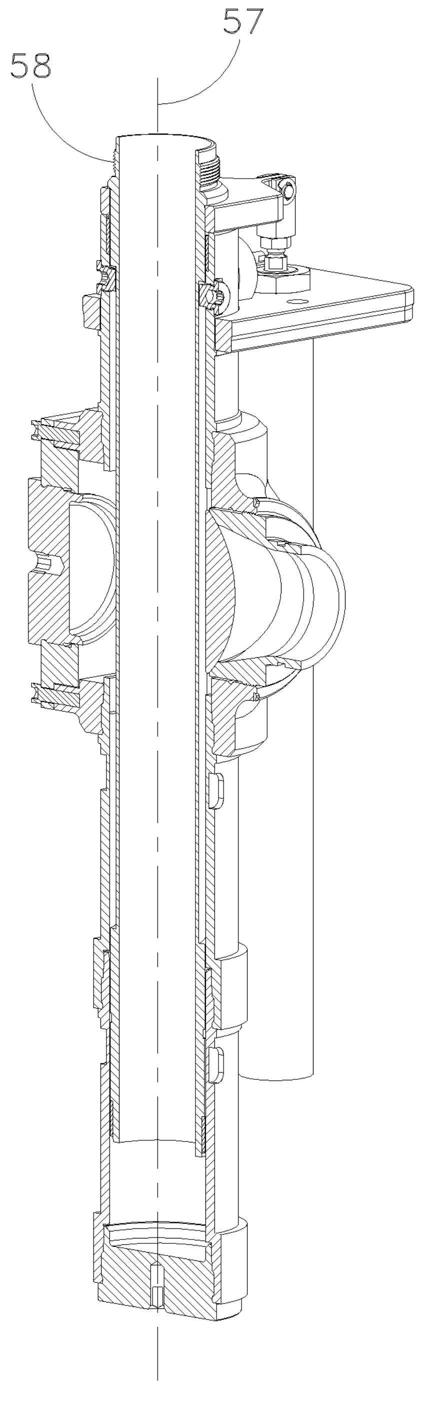
FIGS. 14B, C, and D are isometric views of an operating sequence of three positions of the telescoping waterway and the fourth embodiment of a rotating shutoff element.
Figure 14C:
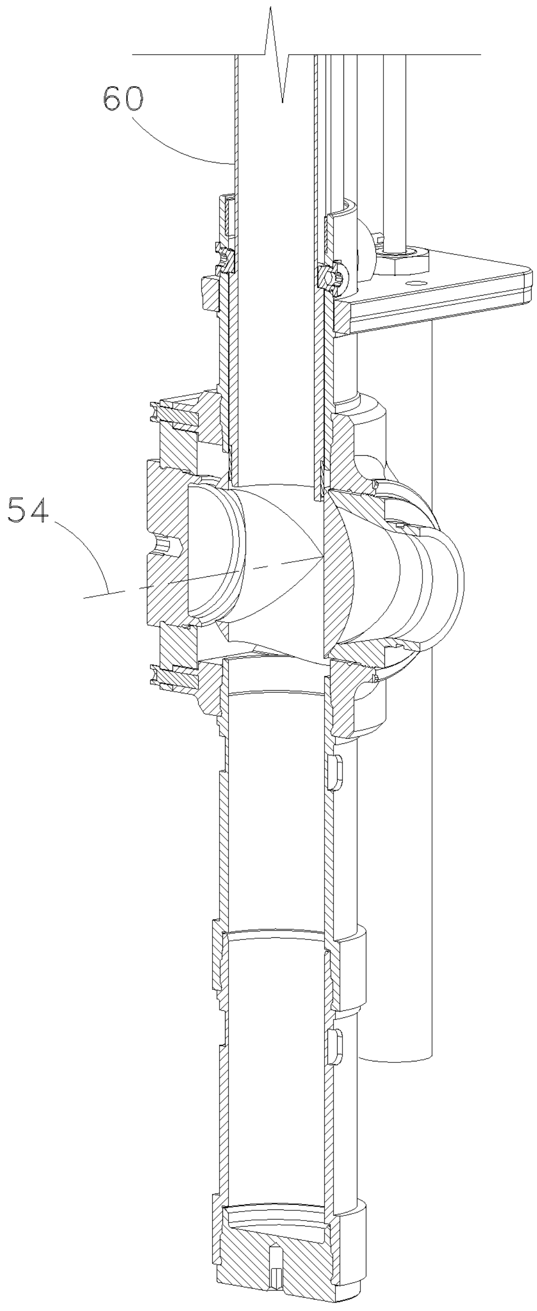
Figure 14D:
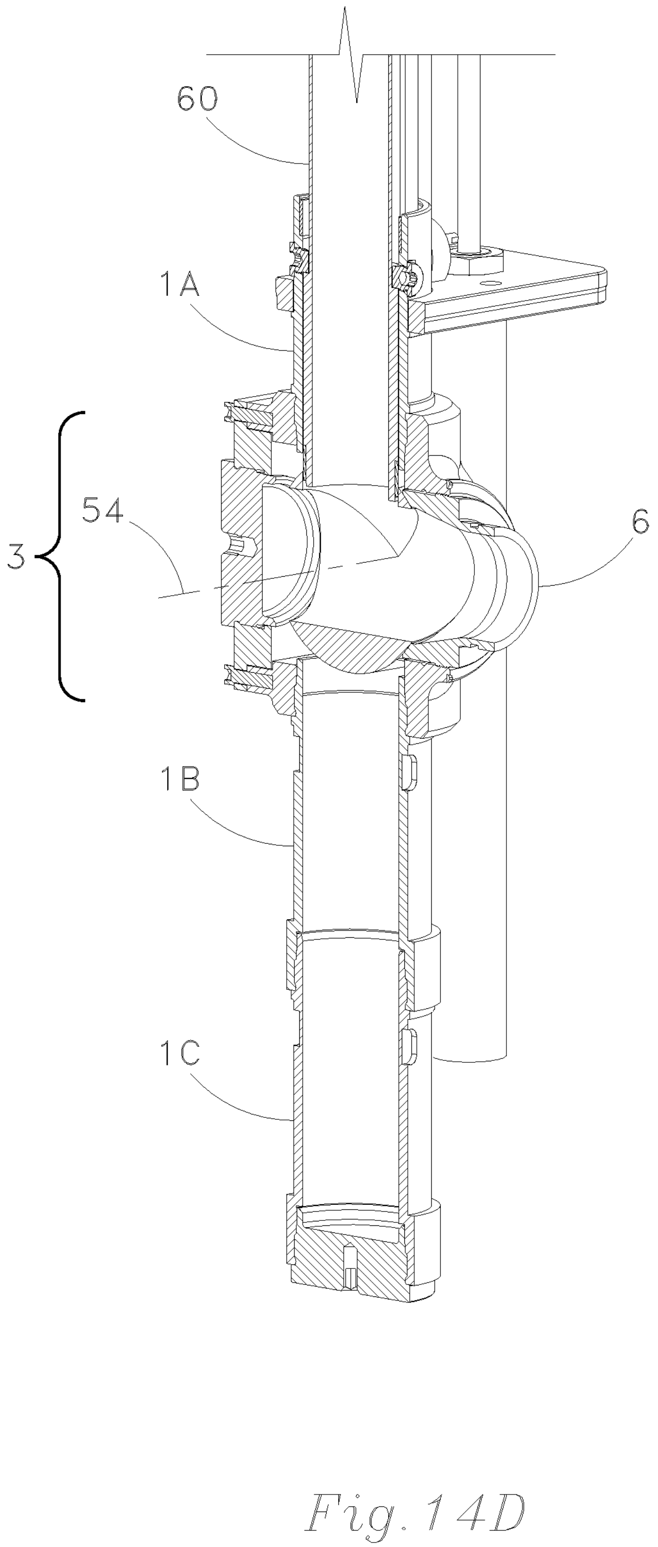

When the shutoff element is closed, as seen in FIGS. 14B and C, the outer surface (53) of the shutoff element blocks the flow of fluid into the manifold. In that position, the inner tube (60) of the waterway is able to travel past and nest within the through hole (55). When the inner tube (60) is fully extended, as seen in FIGS. 14C and D, the rotating shutoff element can be rotated to the open position seen in FIG. 14D, moving the outer surface (53) out of its blocking position and aligning the through hole (55) with the walls of the connection inlet (6) that lead to it. In this position, fluid can flow from the connection inlet and, through the blind hole (56), into the inner tube (60) and then on to a connected monitor or nozzle for discharge.

In many cases, this arrangement can:

minimize the height required for the arrangement, particularly when configured with a bottom inlet that is coaxial with the telescoping waterway;

provide more options for routing other components; and enable the use of better safety controls.

In many cases, this embodiment can provide the same benefits discussed above.

Configurable Inlet Components

The settings in which telescoping tube assemblies are installed can present different challenges. Flexibility in connection options can be an important advantage. Inlet components that provide configurable options can provide significant advantages. Three options are disclosed here.

Figure 4A:
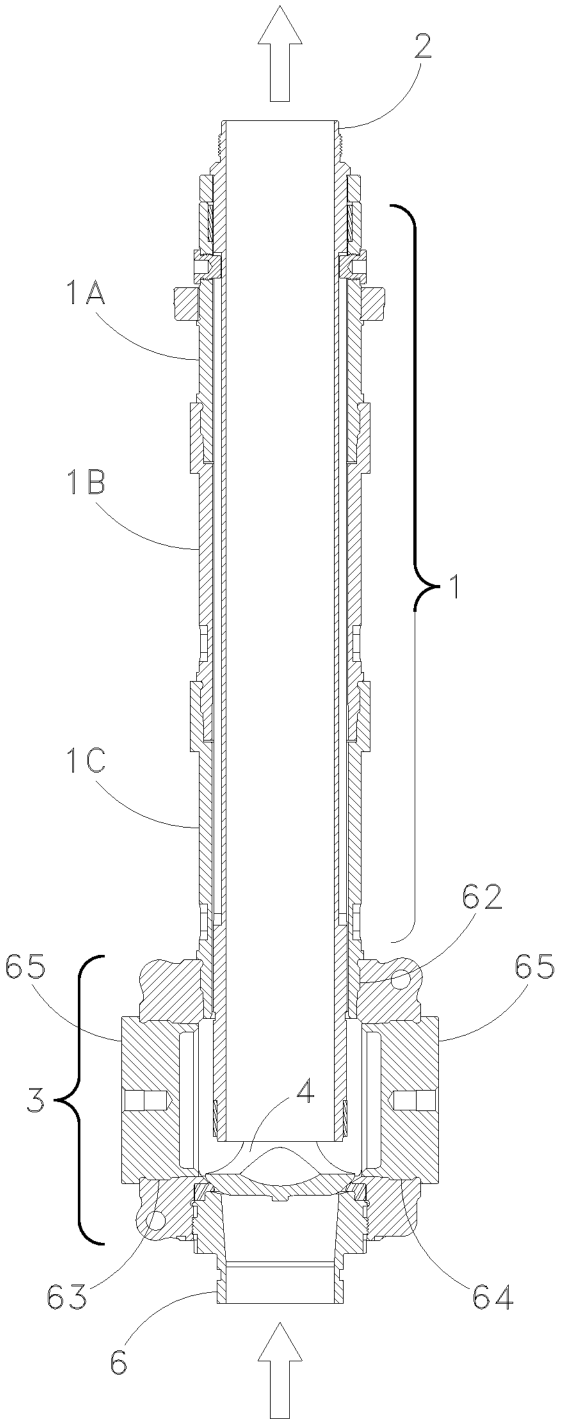
FIGS. 4A and 4B are cross-sectional views of the arrangements seen in FIGS. 3A and 3B.

The Manifold of FIGS. 4A and B

The preferred arrangement of a configurable inlet component is seen in FIGS. 4A and B. As seen there, the inlet component takes the form of a manifold (3) combined with a connection inlet (6). In the illustrated arrangement, this manifold also serves as the housing of the rotating shutoff element (4). However, advantages can be derived whether a valve element is included in the manifold or not.

The illustrated manifold (3) has 4 ports: one facing up in the figures, one facing down, one facing to the right, and one facing to the left. During installation, one of the four ports is selected to serve as an inlet. The connection inlet (6) enables the inlet component to be connected to the system at that point. The connection inlet may be integral with the manifold or may be a separate component fastened to the manifold at the time of installation.

A common connection geometry, such as screw threads in combination with an O-ring seal, can be provided on some ports (62, 63, 64), enabling any of those ports to be connected to the outer tube (1) of the telescoping waterway. Ideally, the connection geometry enables quick assembly or disassembly with common tools. Any unused ports can be sealed by a plug (65) that has corresponding connection geometry.

In the arrangement seen in FIG. 4A, the manifold (3) is arranged with the connection inlet (6) mounted on a port facing downward and the outer tube (1) is connected to an upward facing port (62). The left-facing and right-facing ports (63, 64) are sealed by plugs (65).

Figure 4B:
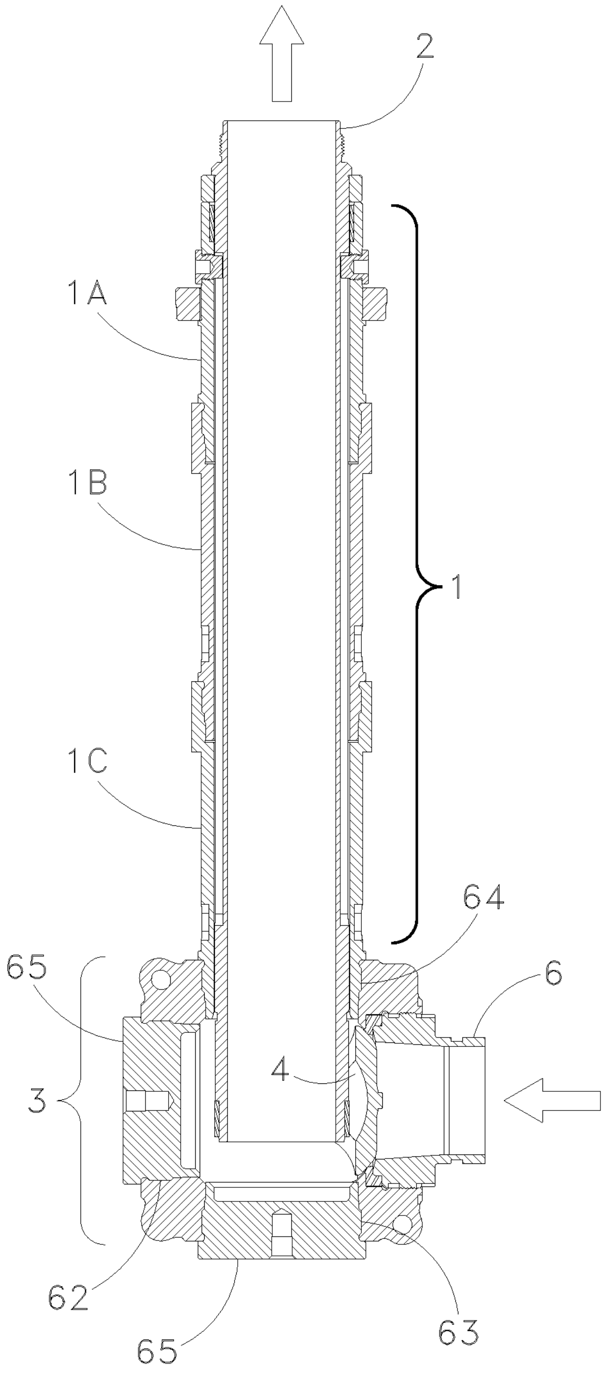

In the arrangement seen in FIG. 4B, the manifold (3) is arranged with the connection inlet (6) mounted on a port facing right. The outer tube (1) is connected to the adjacent port (64), which—in this arrangement—faces up. The remaining ports (62, 63), which here face left and down, are sealed by plugs.

In the arrangement seen in FIGS. 8A and B, the manifold (3) is arranged with the connection inlet (6) facing to a side, and different segments of the outer tube (1) connected to the upward- and downward-facing ports. The co-axial alignment of the two ports adjacent to the one used for the connection inlet enables the inner tube (2) to pass completely through the manifold (3).

The disclosed manifold (3) has two sets of aligned ports, each having axes that are located in a common plane and perpendicular to each other. When the connection inlet (6) is a separate component that can be mounted to different ports on the manifold, the same main benefits can be obtained from a manifold that has only three ports, so long as two of the ports are aligned and the other one is perpendicular to those two.

Conceptually, similar configurability benefits could be achieved using a manifold with 3 or more pairs of coaxial ports, or axes that are separated by any angle other than perpendicular, or axes that are not located in the same plane. These deviations from the illustrated arrangement could enable connection at inlet angles that are not perpendicular to the telescoping waterway, but may require more spatial volume if nesting is desired.

As noted above, the illustrated manifold (3) can serve as a housing for the rotary shutoff element. In FIG. 4A, when the shutoff element (4) is rotated from the closed position to the opened position, it moves from a position closing the connection inlet (6) into the space of either the left- or right-facing closed ports (63 or 64). In FIG. 4B, it moves from a position closing the connection inlet to the bottom-facing closed port (63). In each example, the telescoping inner tube (2) can at least partially nest within the manifold when the valve is closed.

As seen in FIGS. 8A, B, and C, and mentioned previously, the disclosed outer tube (1) can be formed of three segments (1A, 1B and 1C) that are separate from the manifold and share the common connection geometry. In combination with the coaxial ports, this construction enables the manifold (3) to be assembled to the outer tube (1) at 3 different elevations along the height of the outer tube, as seen in FIGS. 8A, B, and C. Conceptually, similar configurability benefits could be achieved using an outer tube that is formed of any number of multiple pieces, providing different connection options.

Figure 9A:
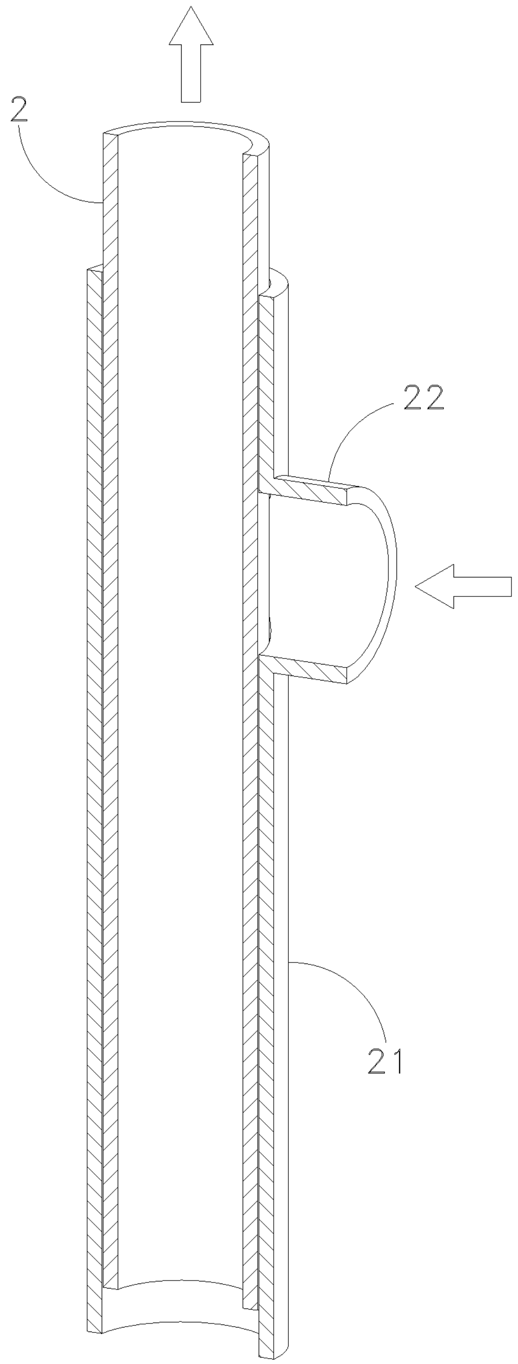
FIGS. 9A and B are cross-sectional views of two alternate ways in which a monolithic tube component can be arranged to alter the inlet position.
Figure 9B:
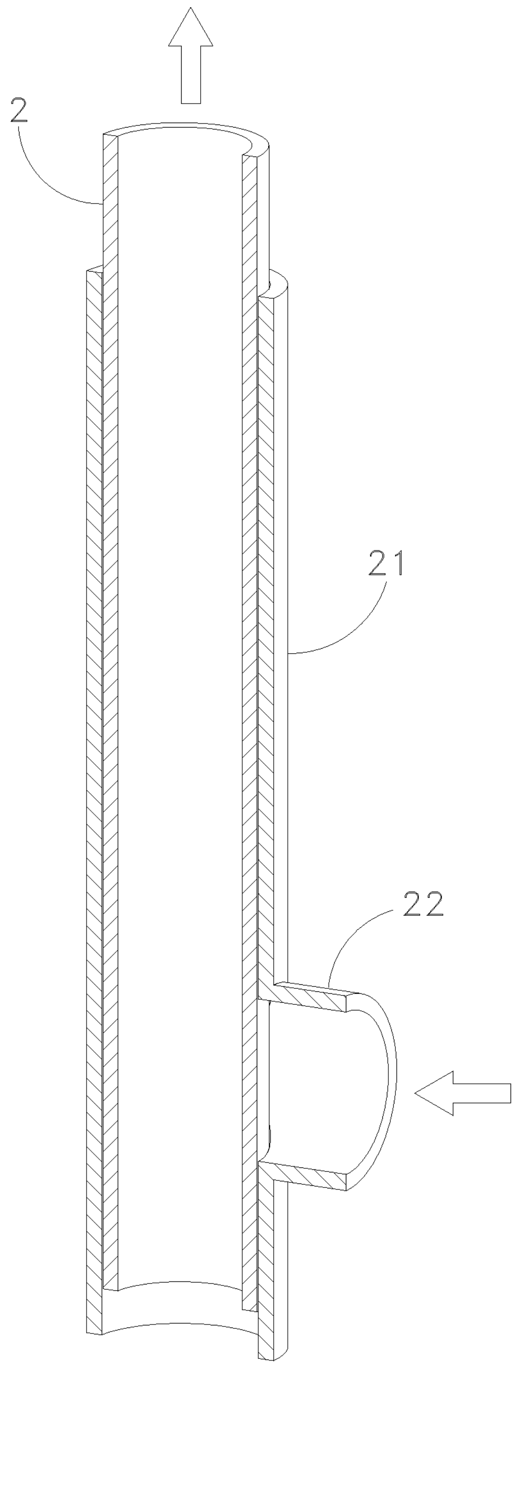

The Inlet Component of FIGS. 9A and B

In an alternate embodiment seen in FIGS. 9A and B, a telescoping waterway arrangement uses a monolithic outer tube (21) that has an orifice on a different type of inlet component (22). The orifice is in a fixed location on the outer tube that is biased towards one end of the tube. This inlet component may either be a structural component of the monolithic outer tube or may be a separate component attached to it that can convey fluid into the telescoping waterway when the inner tube (2) is extended. In this arrangement, the bias of the orifice in the outer telescoping tube towards one end enables an alternate inlet height to be provided by reversing the axial orientation of the outer tube.

The monolithic outer tube may include an operating cavity for a rotating shutoff element, but benefits can also be achieved when no such operating cavity is provided, as illustrated.

This arrangement enables the inlet component to be installed at two different height options.

Figure 10A:
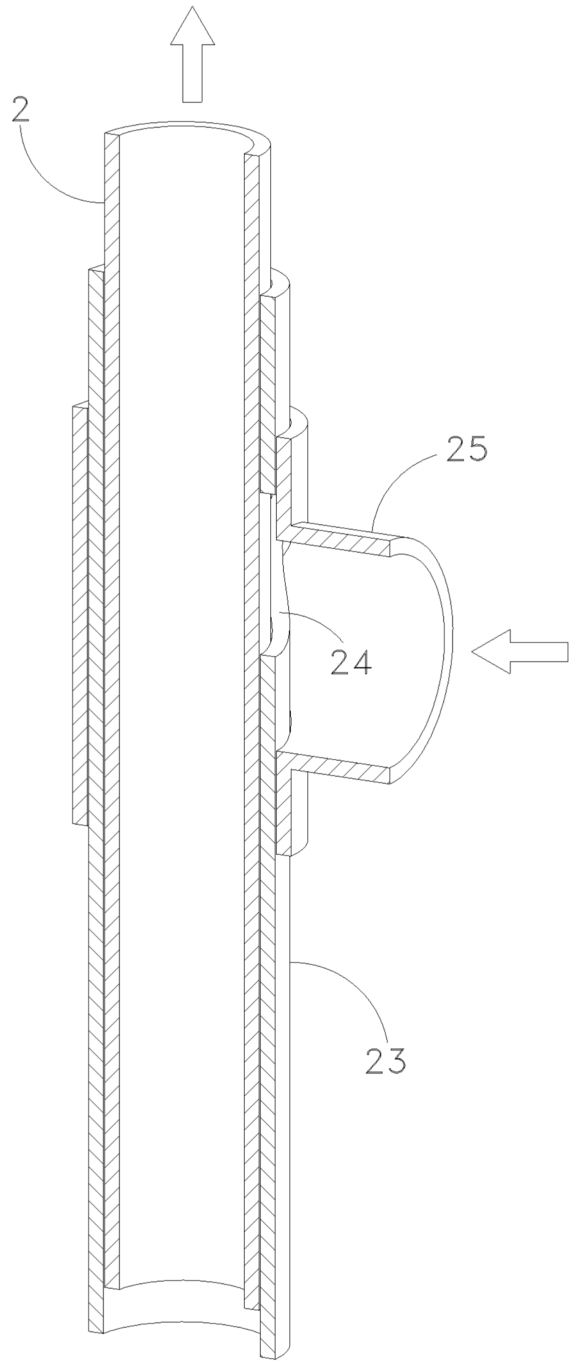
FIGS. 10A, B, and C are cross-sectional views of three alternate ways in which a tube component with a shiftable inlet component can be arranged to alter the inlet position.
Figure 10B:
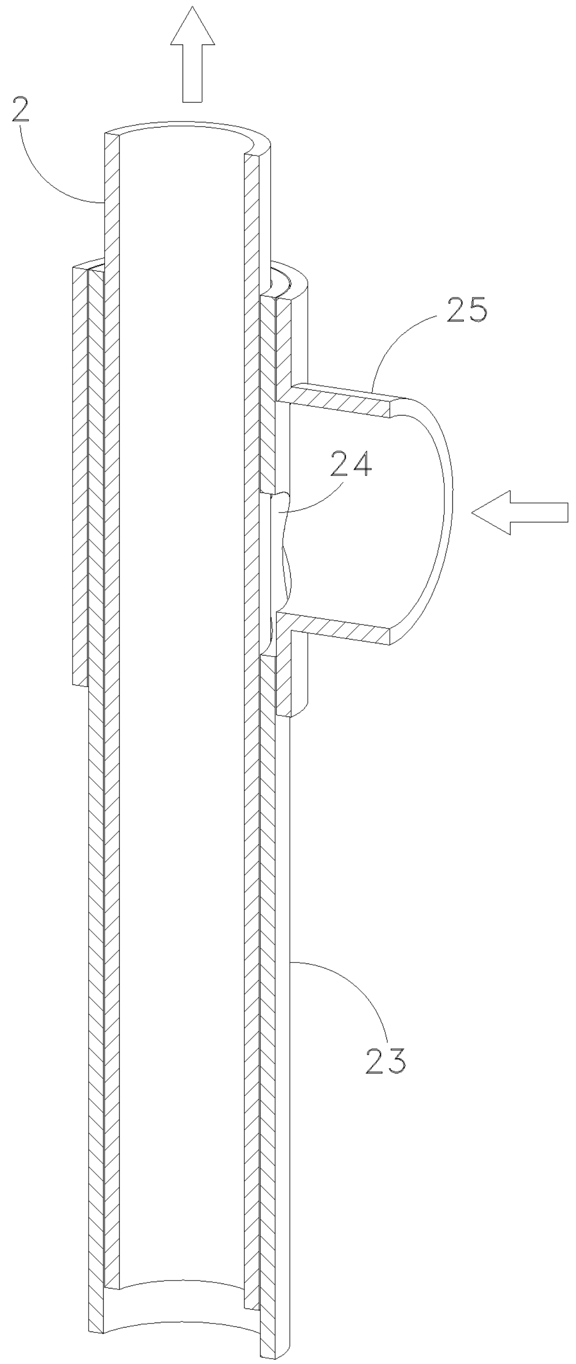
Figure 10C:
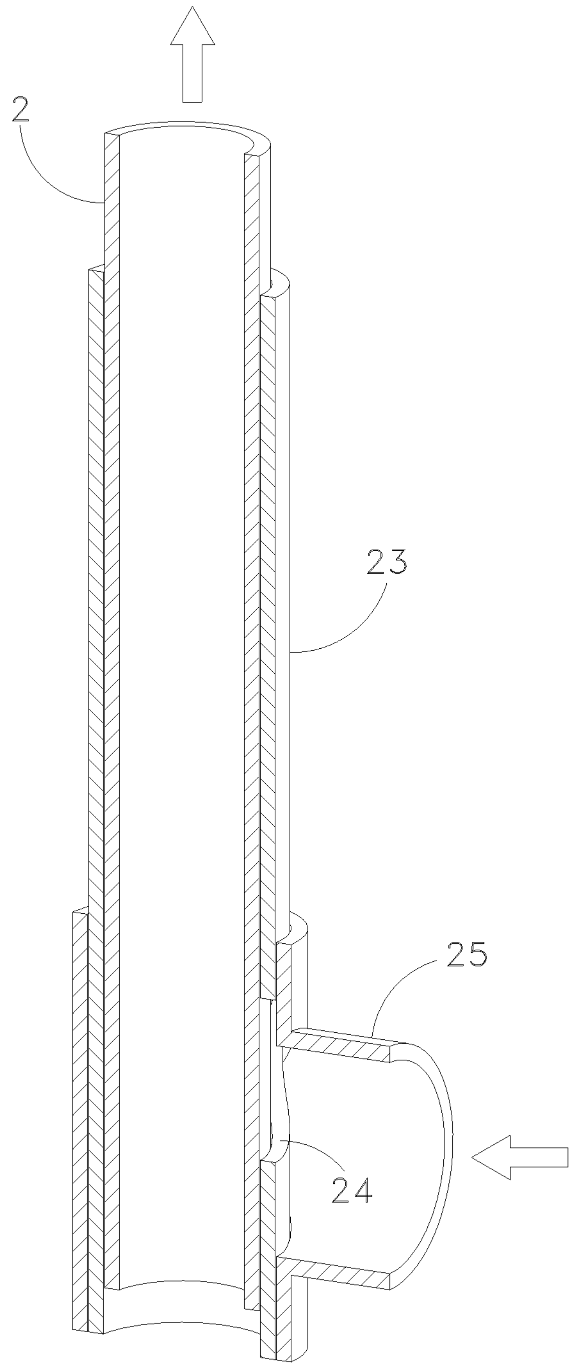

The Inlet Component of FIGS. 10A-C

The positionable inlet component (25) that is illustrated in FIGS. 10A-C takes the form of a hollow tube that nests around the monolithic outer tube (23) of the telescoping waterway. This positionable inlet component is sealed to the outer telescoping tube but has a range of axial motion. In this arrangement, an orifice (24) is provided in the outer tube (23) to serve as a passageway to receive fluid from the inlet component.

In the illustrated arrangement, the orifice (24) on the telescoping outer tube (23) is biased towards one end. With this bias, reversing the axial orientation of the tube can double the range of inlet height options.

Again, the monolithic outer tube (23) may include an operating cavity for the moving valve element, but benefits can also be achieved when no such operating cavity is provided, as illustrated.

This arrangement also enables the inlet component to be installed at multiple different height options.

The Valve Interlock

Flow of fluid through the telescoping waterway when the waterway is not fully extended can cause problems. A valve interlock can be used to help ensure that the waterway is not opened to the flow of fluid unless the waterway is fully extended, and/or that the telescoping tube is not retracted until the valve is closed. Five options are disclosed in the figures.

Figure 16A:
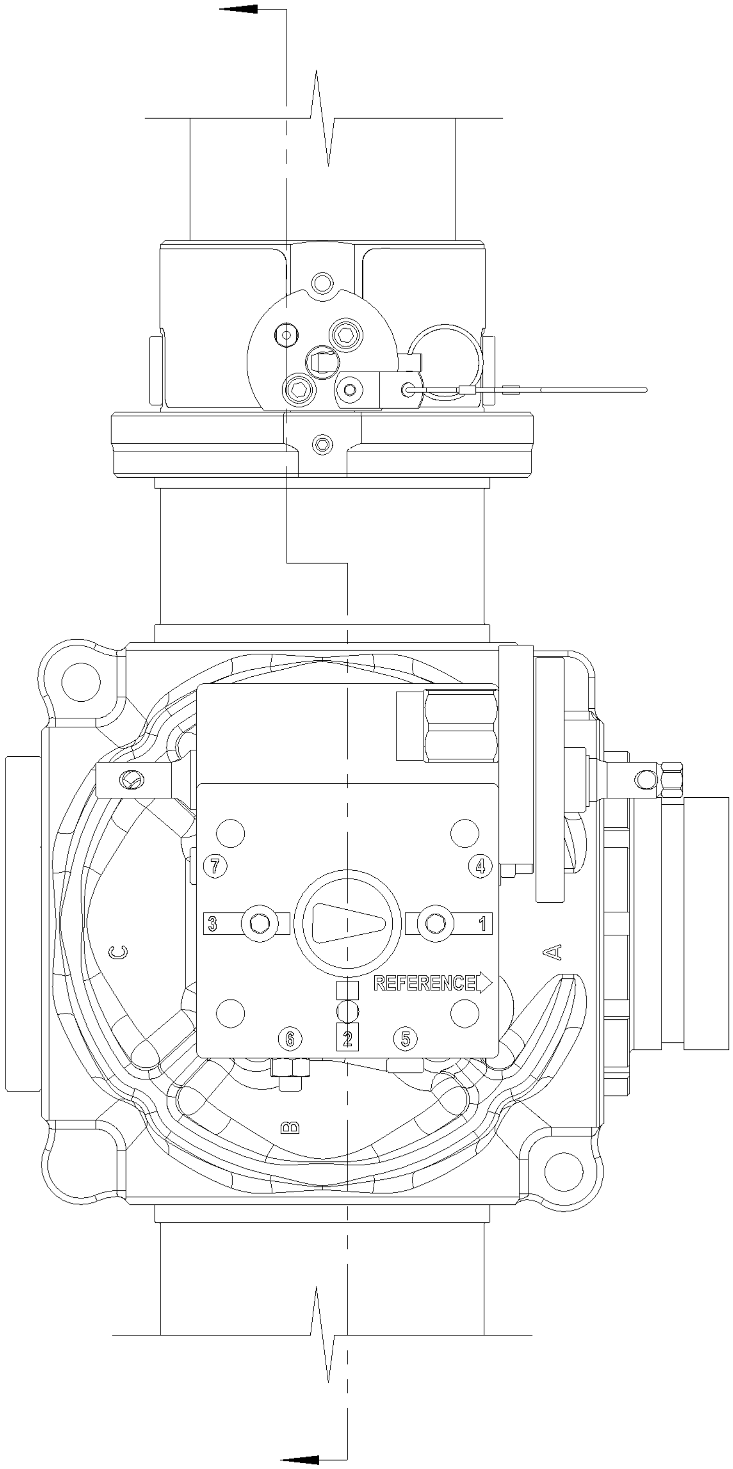
FIGS. 16A and B are side and cross-section views showing how a reed switch can be triggered when the telescoping waterway is fully extended.
Figure 16B:
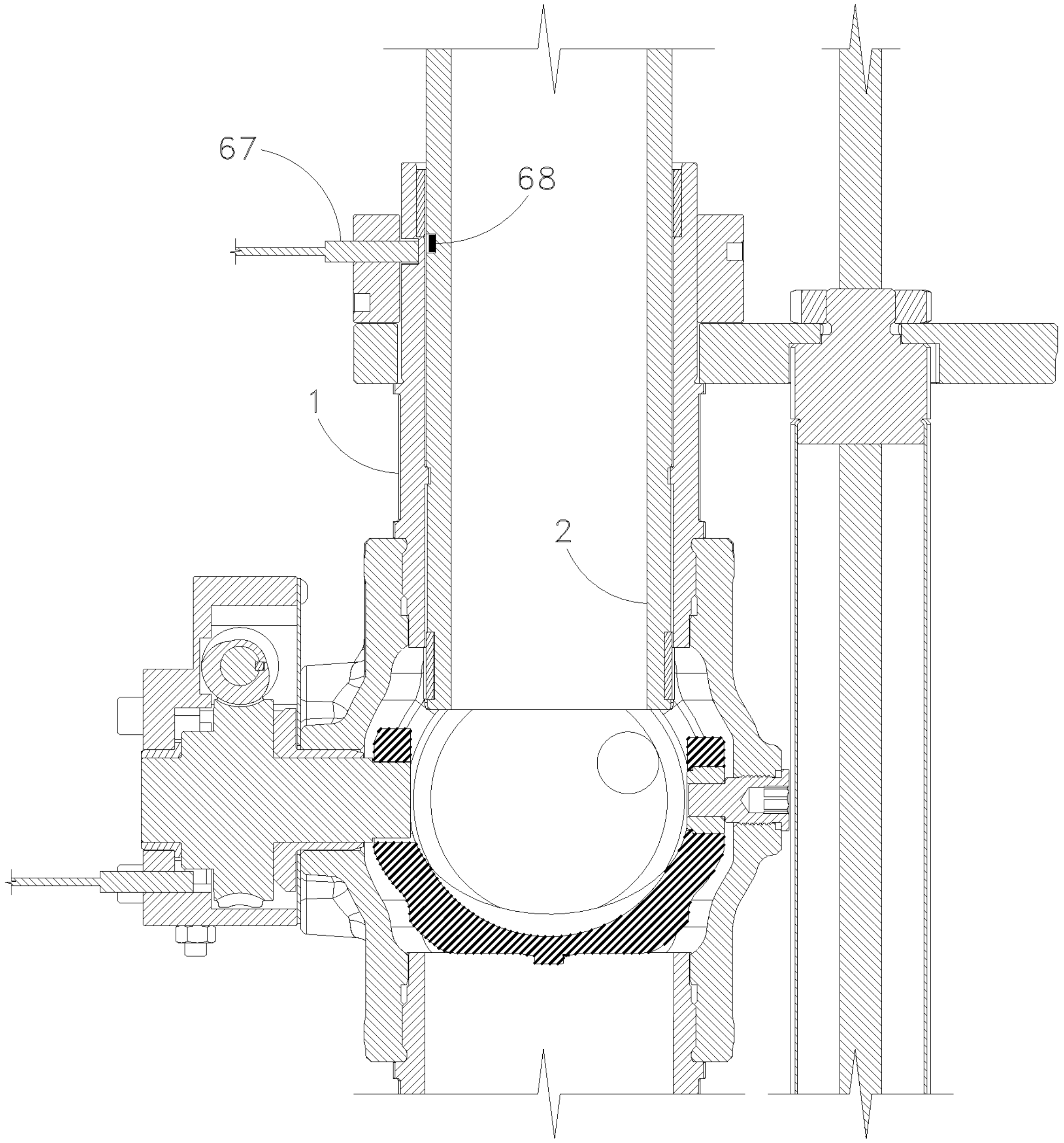

The Interlock of FIGS. 16A and B

Figure 18A:
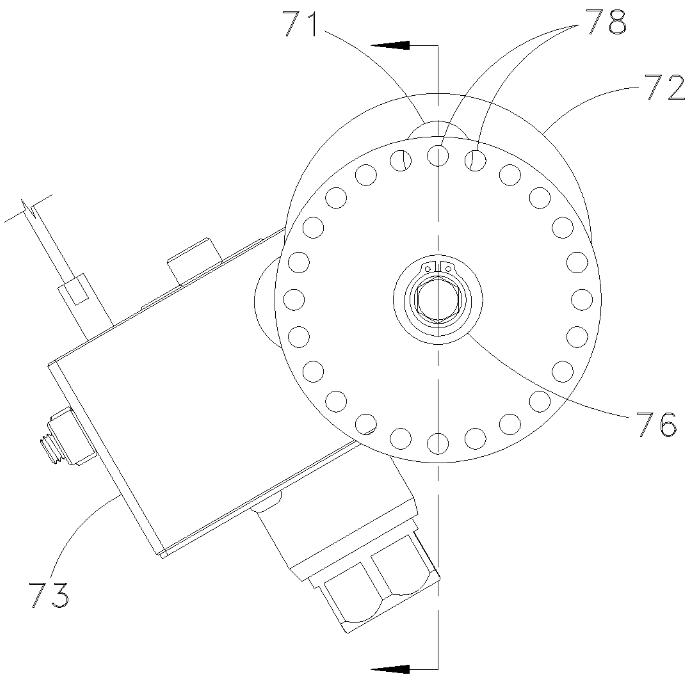
FIGS. 18A, B, C, and D are rotated orthogonal views showing the use of a solenoid actuated latch in the system.
Figure 18B:
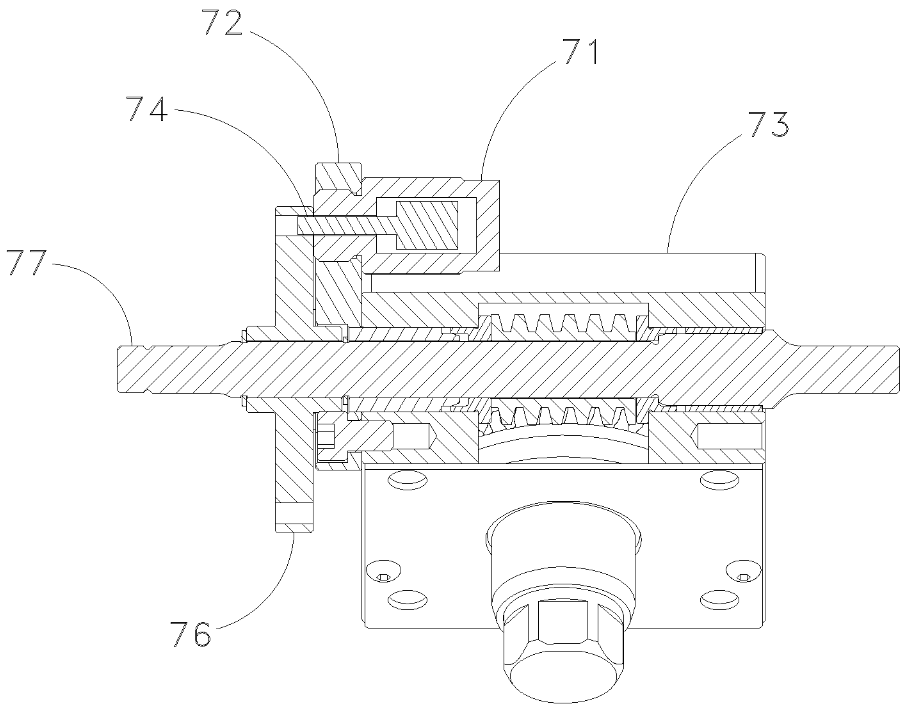
Figure 18C:
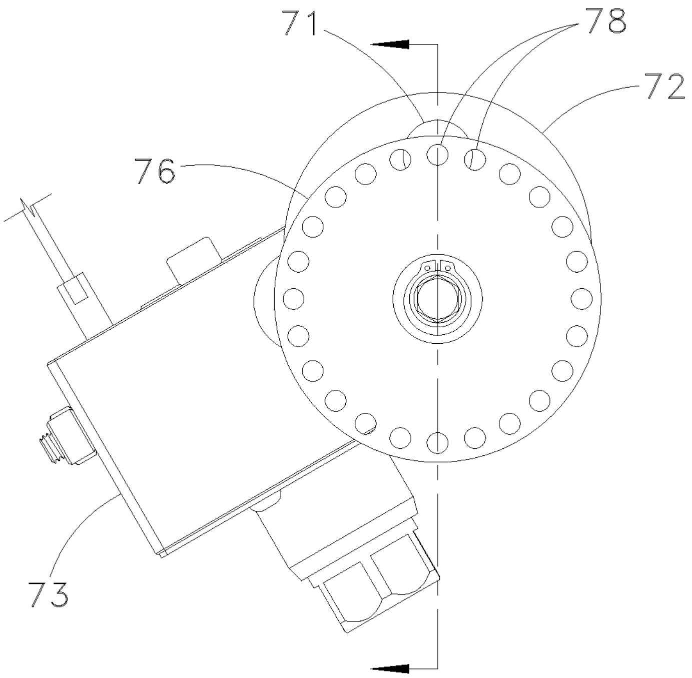
Figure 18D:
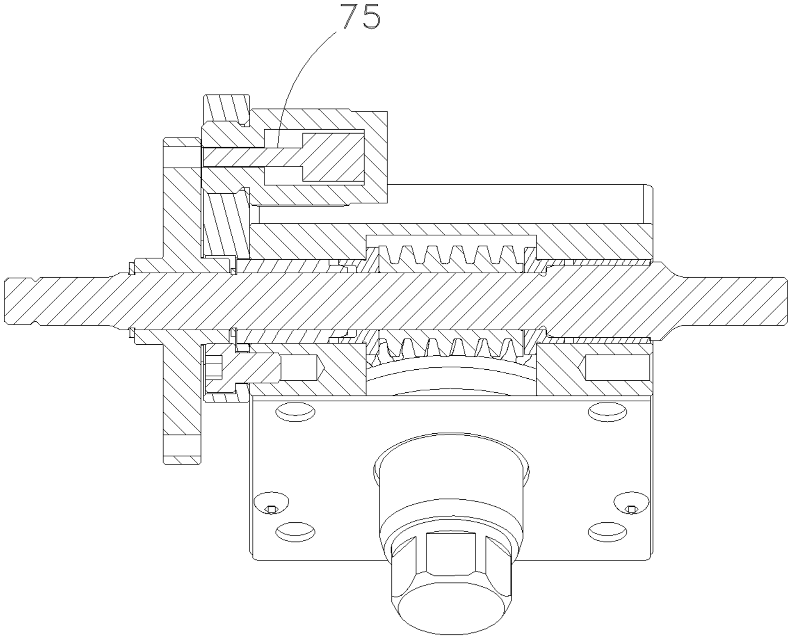

FIGS. 16A and B show a preferred interlock. A momentary electrical input switch in the form of a reed switch (67) is mounted to the outer tube (1) of the telescoping waterway, and a permanent magnet (68) is mounted to the inner tube (2) of the telescoping waterway. The magnet is located such that the switch only flips its open/closed state when the telescoping waterway is in the fully extended position. Either a normally open or normally closed switch can be used, since either type is able to trigger an electric relay appropriately. In the fully extended position, an electric relay coupled to the illustrated switch outputs DC voltage to a solenoid (71) that is mounted in a fixed location with respect to the valve body and/or operator controls, as seen in FIG. 18B. As illustrated, this fixed location is on a bracket (72) that is rigidly mounted to a worm drive gearbox (73). The solenoid has a plunger that is normally extended (as seen here) in the absence of electrical voltage and retracts (as seen in FIG. 18D) when the specified DC voltage is applied. A sprocket (76) with a circular pattern of holes is fastened to the input shaft (77) by a means that can resist shaft torque, such as a rectangular prismatic key that engages keyways in the shaft and sprocket. The solenoid is located and oriented such that the plunger engages the next adjacent hole (78) in the sprocket as the input shaft rotates in the direction that opens the valve, thus serving as an interlock device. The holes are spaced such that the valve becomes locked in a fully closed condition, despite the discrete orientations of the holes causing the fully closed position of the moving valve element to vary slightly.

This arrangement precludes an operator from opening the waterway valve if the telescoping waterway is not fully extended.

Figure 17A:
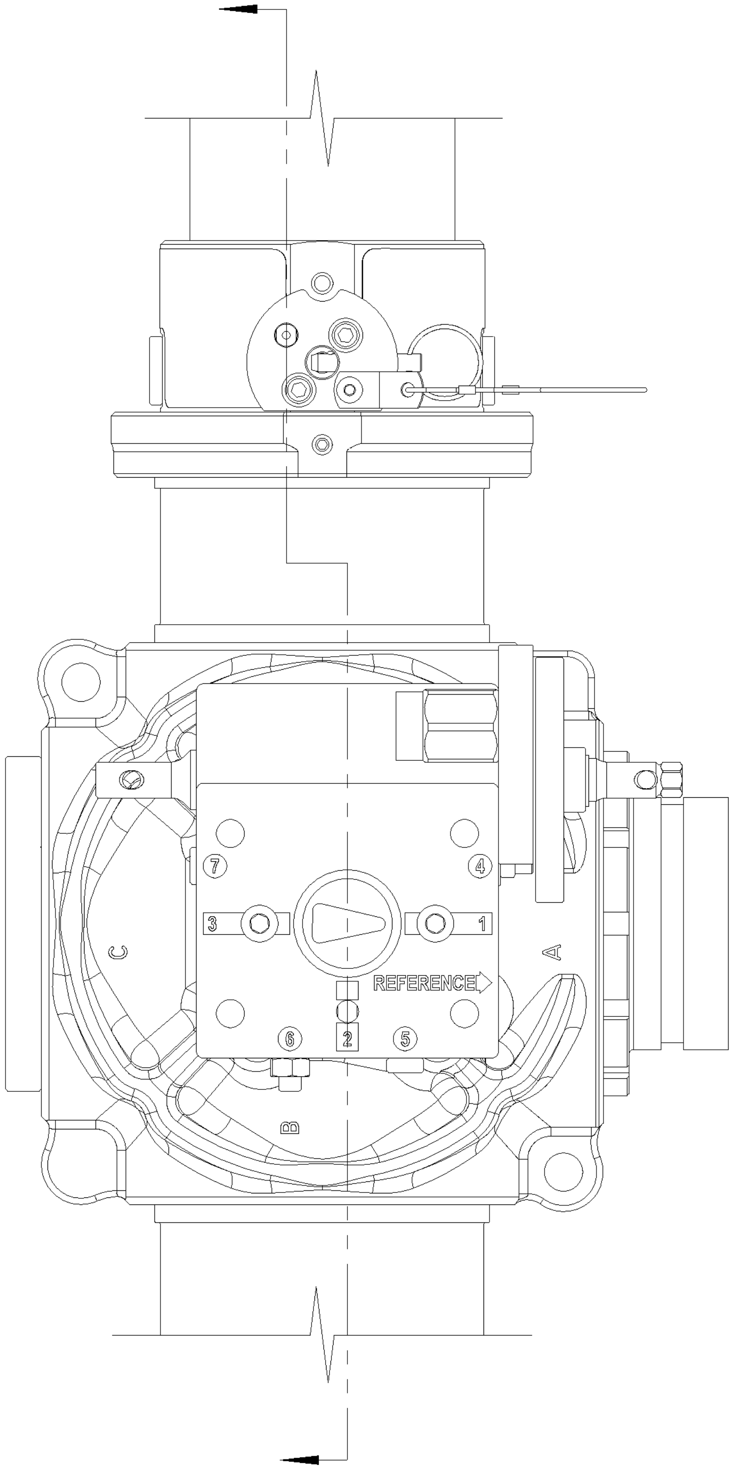
FIGS. 17A and B are side and cross-section views showing how a limit switch can be triggered when the telescoping waterway is fully extended.

The Interlock of FIGS. 17A and B

Figure 17B:
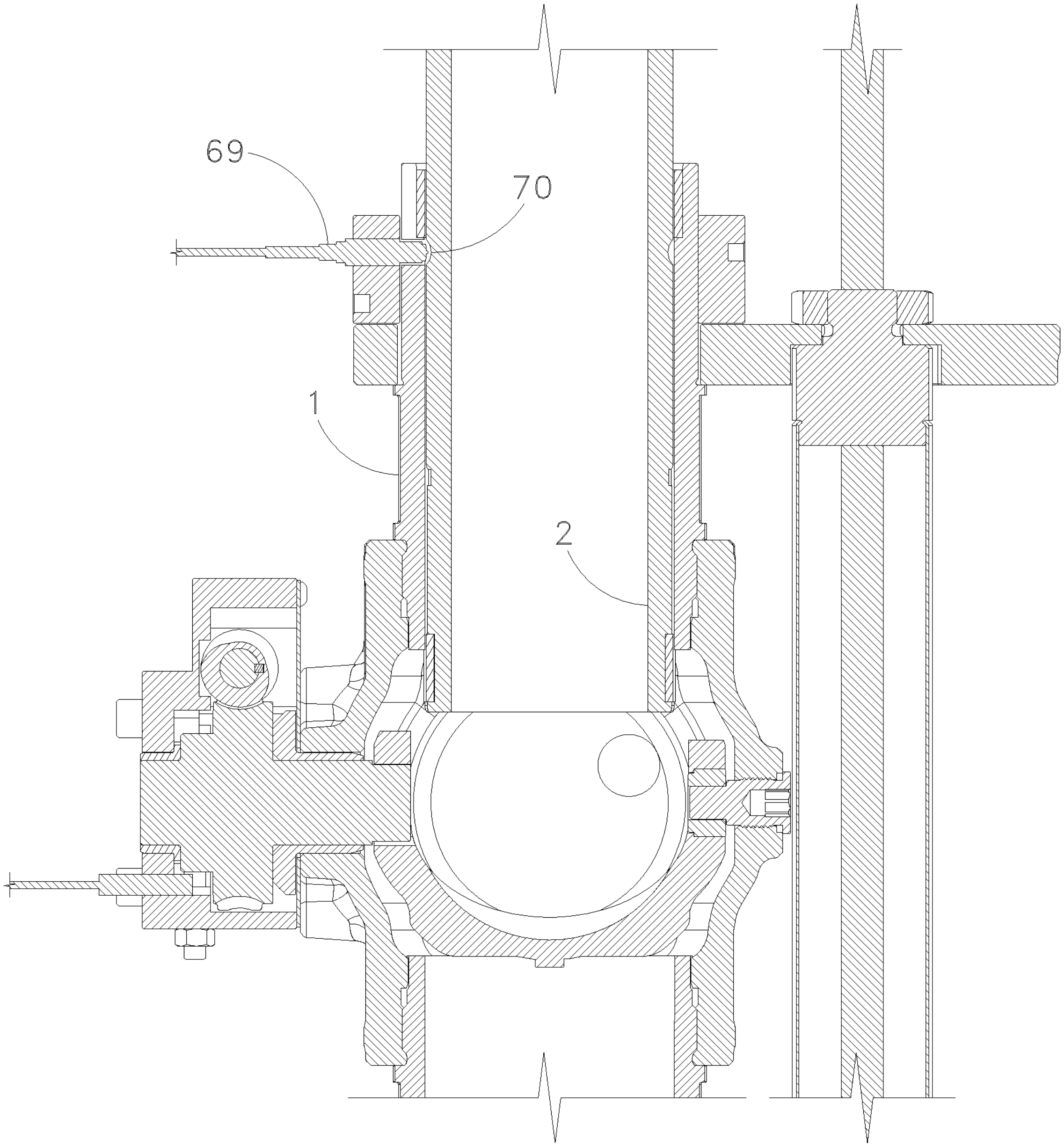

FIG. 17 shows an alternative to the momentary electrical input switch that takes the form of a limit switch (69) that is mounted to the outer tube (1) of the telescoping waterway, and a circumferential groove (70) that is cut into the inner tube (2) of the telescoping waterway. The groove is located such that the switch only flips its open/closed state when the telescoping waterway is in the fully extended position.

Again, this arrangement precludes the operator from opening the waterway valve if the telescoping waterway is not fully extended.

The Interlock of FIGS. 20A-D

Figure 19:
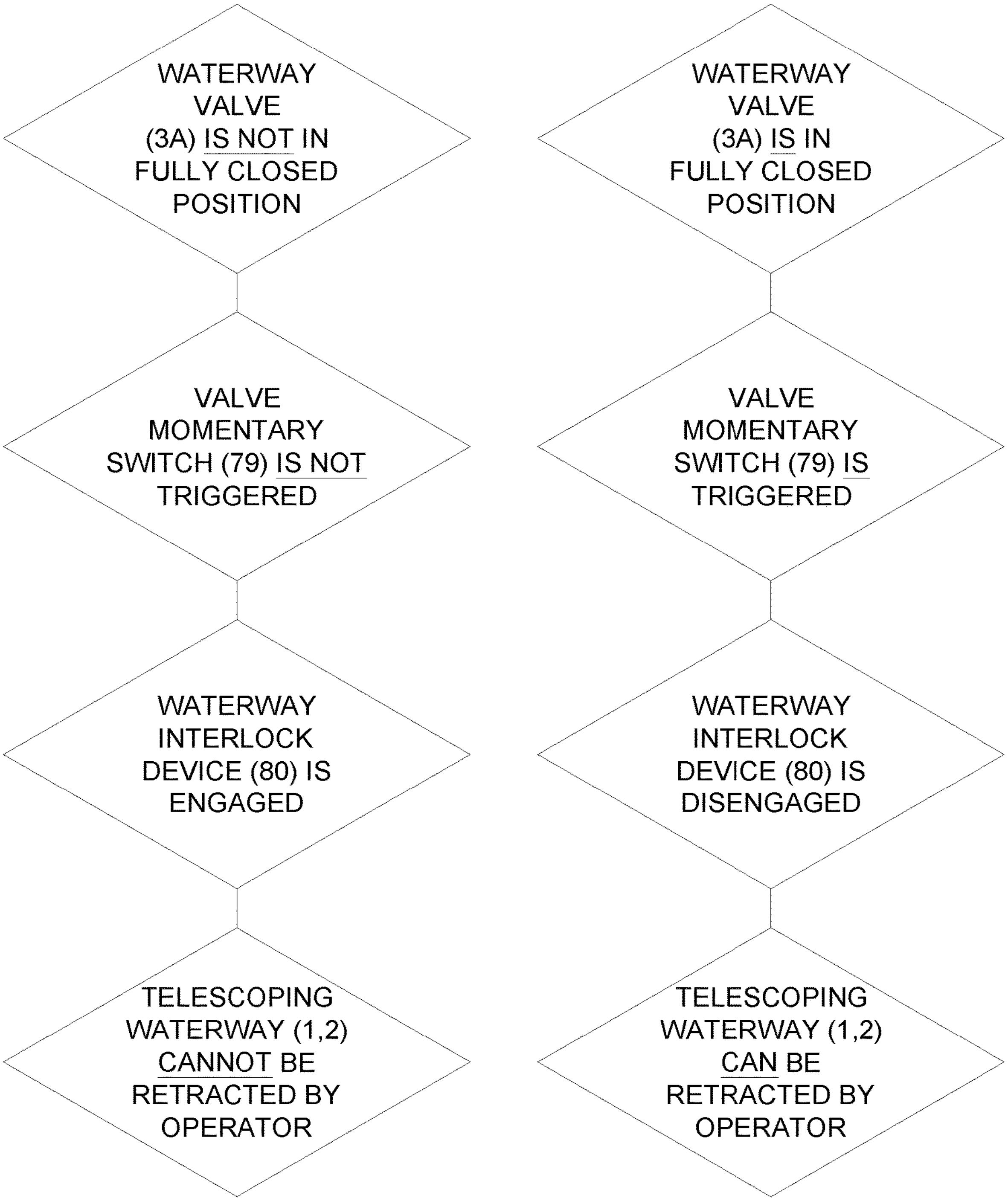
FIG. 19 is a circuit layout of a valve control circuit that permits the operator to retract the telescoping waterway from the fully extended position only if the valve is in the fully closed position.
Figure 20A:
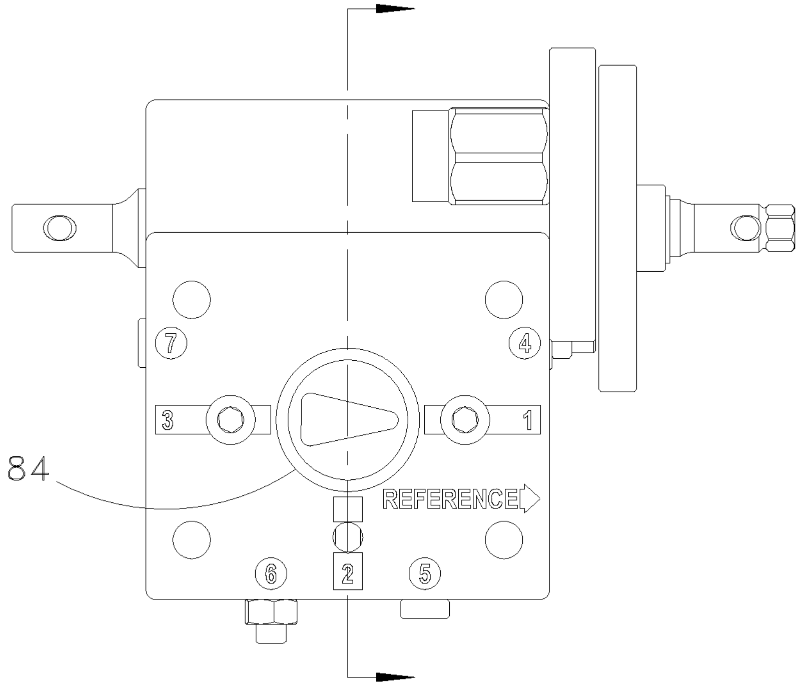
FIGS. 20A, B, C, and D are side and cross-sectional views showing use of a reed switch in the system.
Figure 20B:
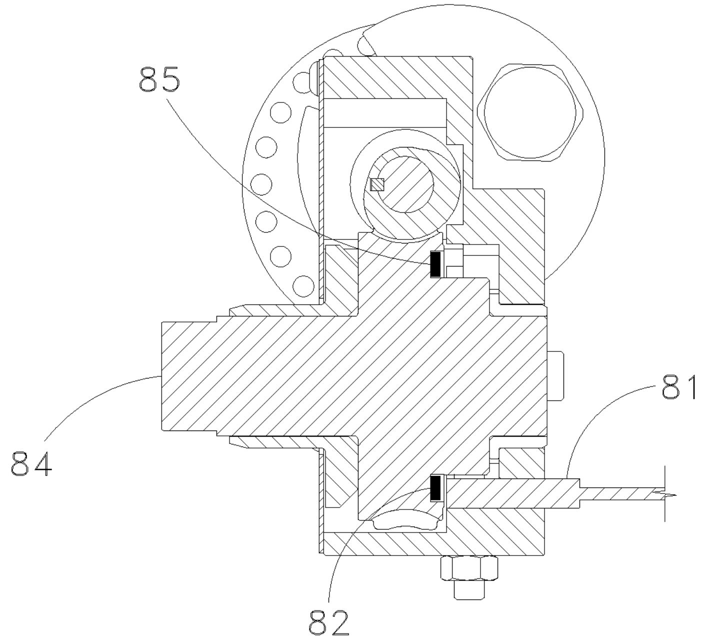
Figure 20C:
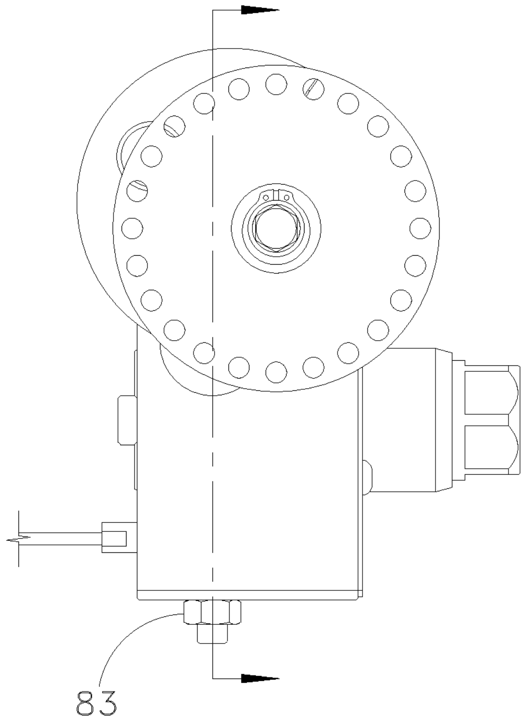
Figure 20D:
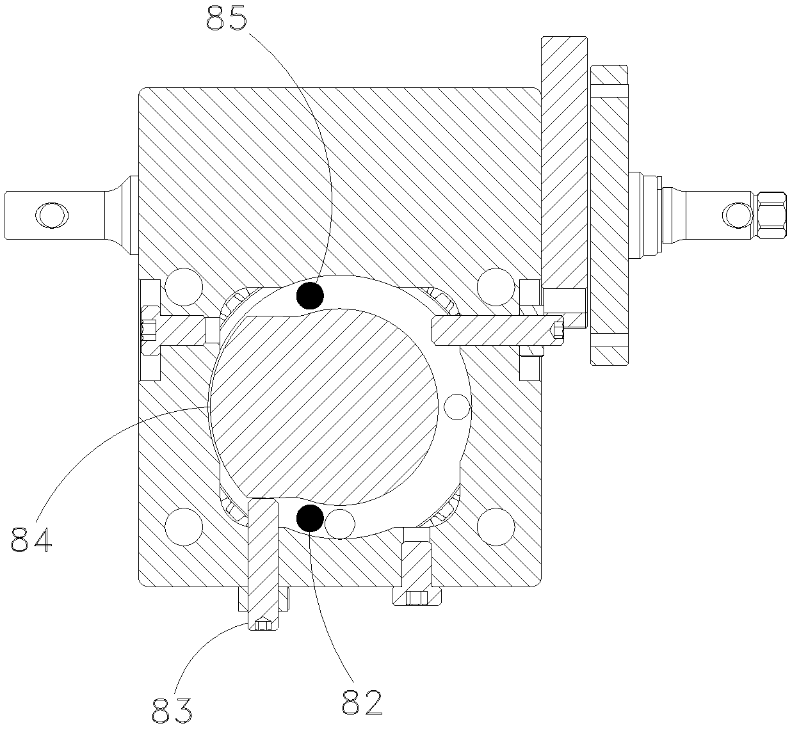
Figure 21A:
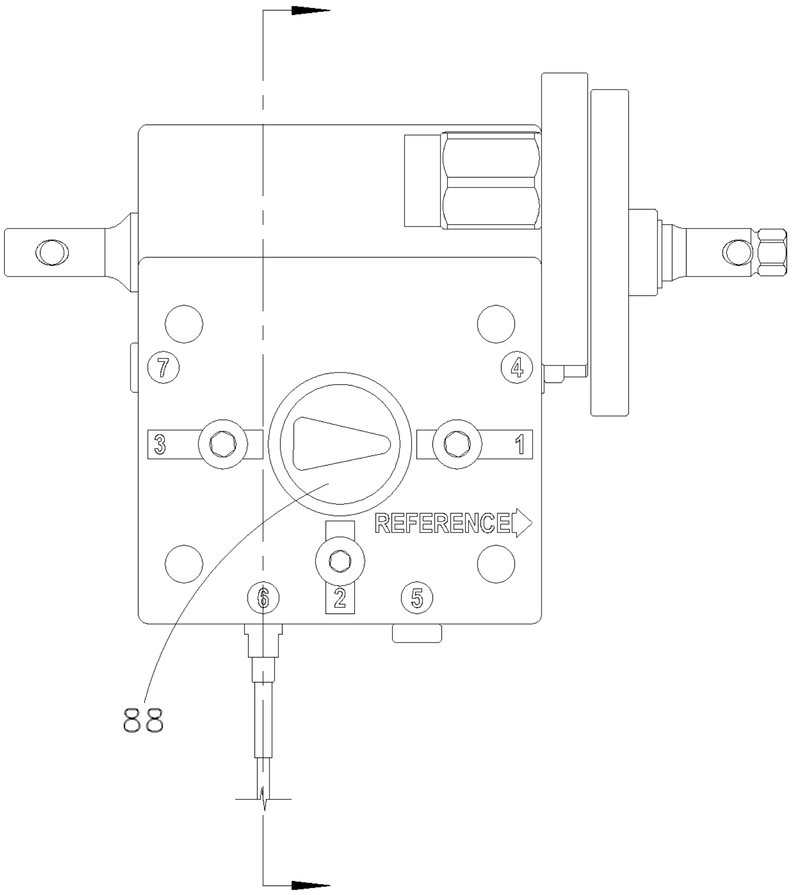
FIGS. 21A, B, C, and D are side and cross-sectional views showing use of a limit switch in the system.
Figure 21B:
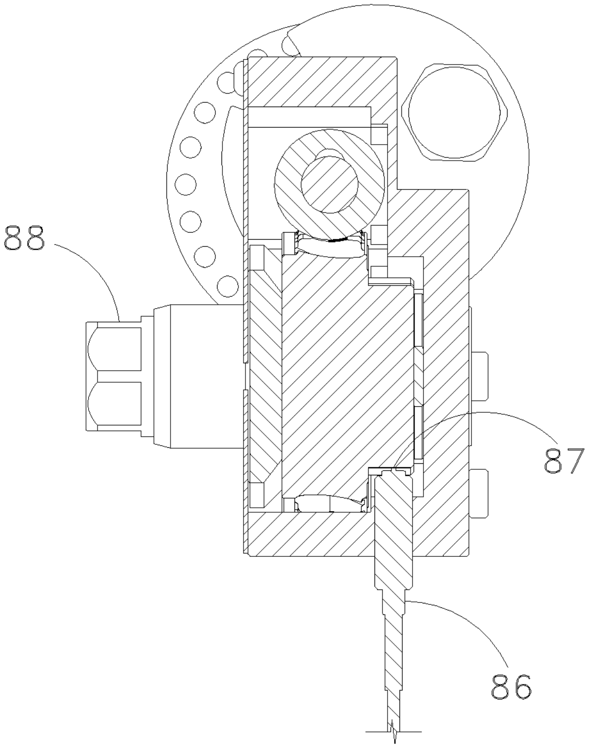
Figure 21C:
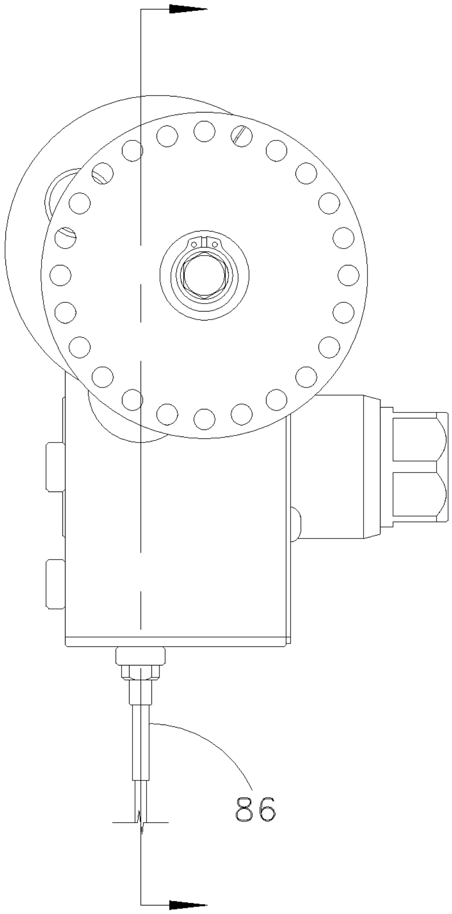
Figure 21D:
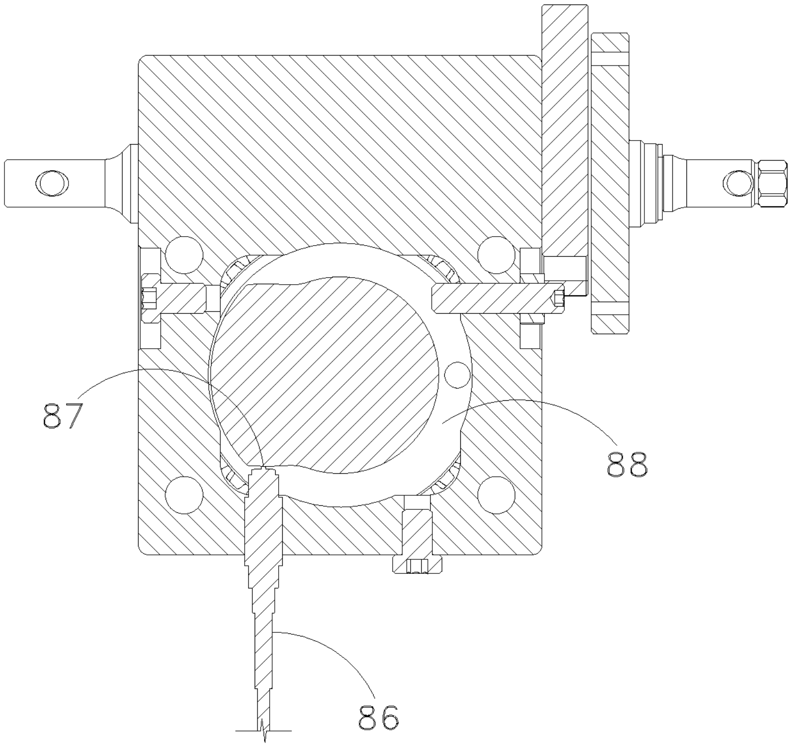

The focus of the interlock can also be on ensuring that the inner tube of the waterway cannot be retracted when the valve is open. As seen in FIG. 19, a momentary electrical input switch can be triggered when the valve is in the fully closed position.

FIGS. 20A-D show a preferred embodiment of this kind of arrangement. The switch takes the form of a reed switch (81) that flips its open/closed state when it is in close proximity with a permanent magnet (82). The permanent magnet is located such that the open/closed state of the reed switch is flipped when the valve operator control reaches a travel stop that corresponds with the fully closed position of the valve. Here, a set screw (83) mechanically limits the travel of a trunnion (84) that controls the rotary position of the shutoff element. One or more additional permanent magnets (85) may be provided in locations that do not trigger the reed switch for a given assembly configuration of these components, yet may serve that function for a different assembly configuration.

Figure 22:
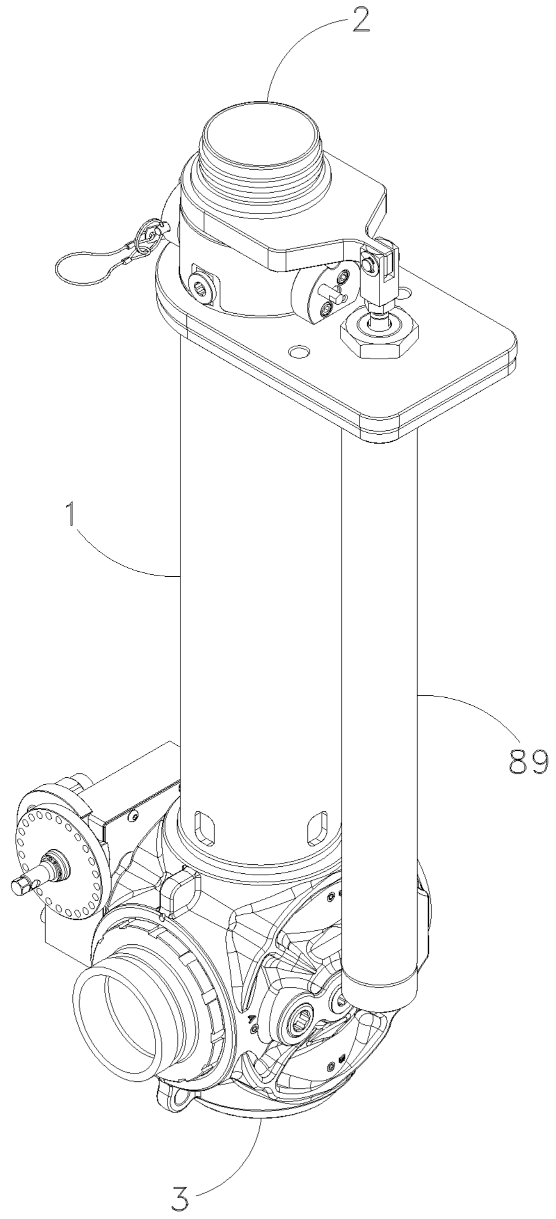
FIG. 22 is an isometric view of a telescoping waterway that includes both an integrated valve and a pneumatically driven lift mechanism.

The reed switch (81) is joined in a series circuit with an on/off operator switch that is connected to the input of an electrical relay. The output of the electrical relay is connected to a solenoid actuated valve that is normally in the valve closed position. Functionally, the electrical relay could be omitted if both switches had sufficient electrical current ratings to drive the output load without damage. When both the reed switch and the operator switch are triggered, the output changes its open/closed state, thus interlocking the parts and causing the solenoid actuated valve to open. The illustrated solenoid actuated valve supplies air pressure from the firefighting vehicle to the extend side of a pneumatic cylinder (89) seen in FIG. 22. The force from that cylinder extends the telescoping waterway.

This arrangement prevents an operator from retracting the telescoping waterway if the waterway valve is not in the fully closed position.

The Interlock of FIGS. 21A-D

An alternate arrangement for the momentary electrical input switch is illustrated in FIGS. 21A-D. Here, the switch takes the form of a limit switch (86) that flips its open/closed state when the plunger is compressed to be flush with the end face of the limit switch. The body of the illustrated limit switch is integrated into a set screw, such that the end with the plunger (87) also serves to mechanically limit the travel of the trunnion that controls the rotary position of moving element of the waterway shutoff valve. This switch is positioned so that the open/closed state is flipped only when the valve is in the fully closed position. Rotating the trunnion flush against the body of the limit switch simultaneously stops the travel and triggers the switch. The limit switch is joined in a series circuit with an on/off operator switch connected to the input of an electrical relay. The output of the electrical relay is connected to a solenoid-actuated valve that is normally in the valve closed position. Again, the electrical relay could be omitted if both switches had sufficient electrical current ratings to drive the output load without damage. When both the limit switch and the operator switch are triggered, the circuit changes its open/closed state, thus interlocking the parts and causing the solenoid-actuated valve to open. Again, the illustrated solenoid-actuated valve supplies air pressure from the firefighting vehicle to the extend side of a pneumatic cylinder (89) that is capable of extending the telescoping waterway.

This arrangement prevents an operator from retracting the telescoping waterway if the waterway valve is not in the fully closed position.

Figure 23:
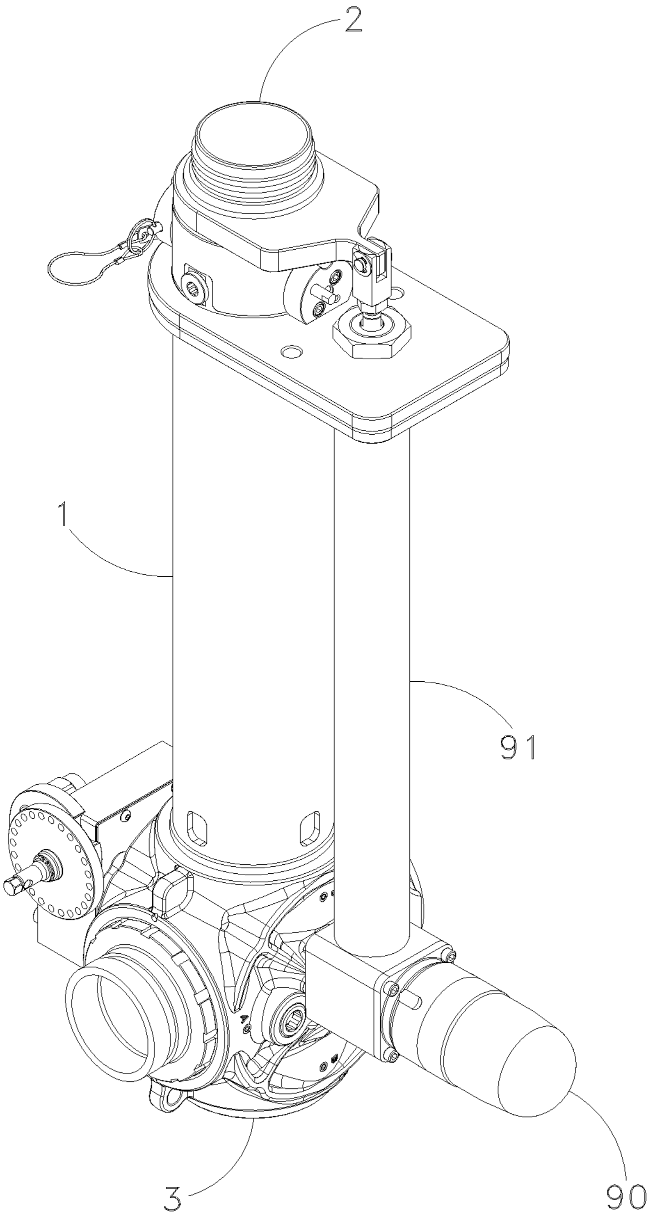
FIG. 23 is an isometric view of a telescoping waterway that includes both an integrated valve and a lift mechanism that includes an electric motor that drives a lead screw.

The Interlock of FIG. 23

Figure 24:
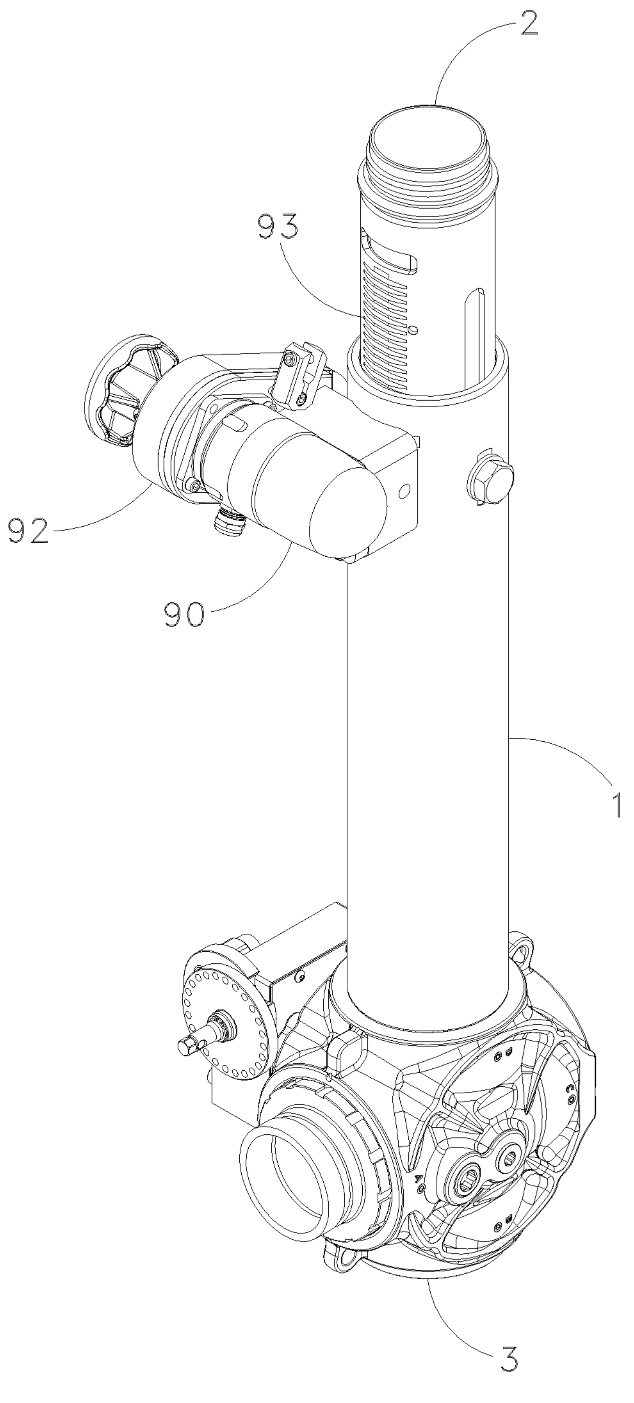
FIG. 24 is an isometric view of a telescoping waterway that includes an integrated valve and an electric motor that drives a gear rack that is integral to the inner tube.

FIG. 23 illustrates another alternate arrangement of the momentary electrical input switch that can be used to implement the process that is illustrated in FIG. 19. Here, the switch could be in the form of a reed switch per FIG. 20 or a limit switch per FIG. 21. The switch is joined in a series circuit with an on/off operator switch that is connected to the input of an electrical relay. The electrical relay could be omitted if both switches had sufficient electrical current ratings to drive the output load without damage. Otherwise, the output of the electrical relay is connected to an electric motor (either directly or via a control circuit). An electric motor (90) drives the extension and retraction of the telescoping waterway, either via a leadscrew actuator (91) or—as illustrated in FIG. 24—via a gear mechanism (92) that engages a gear rack (93) that is cut into the inner tube of the telescoping waterway. When both the valve position limit switch and the operator switch are triggered, the circuit changes its open/closed state, thus enabling power to be supplied to the electric motor to extend or retract the telescoping waterway.

This arrangement prevents an operator from retracting the telescoping waterway if the waterway valve is not in the fully closed position.

Alternate Versions of the Interlock

Figure 15:
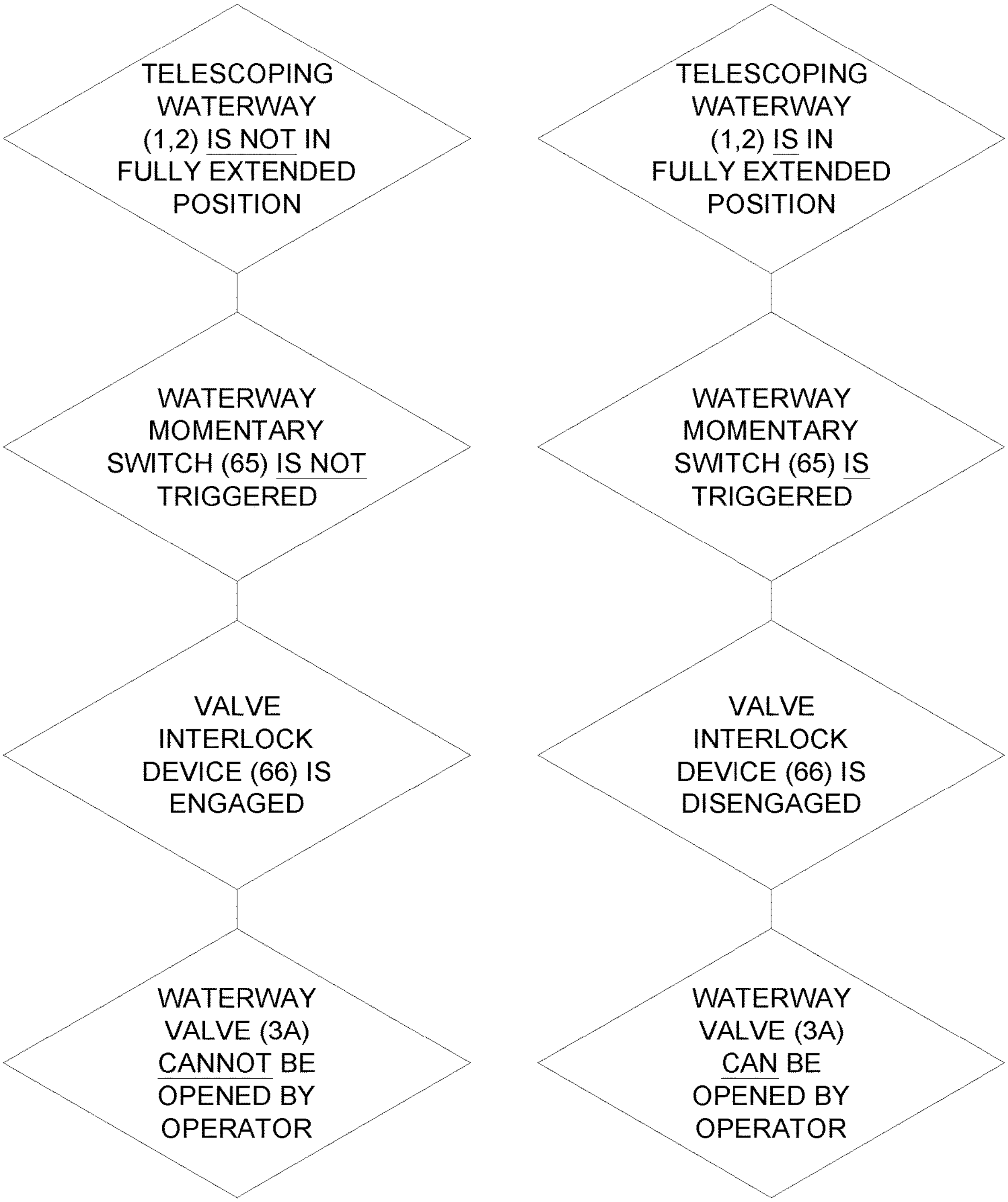
FIG. 15 is a circuit layout of a valve control interlock circuit that permits the operator to open the valve only if the telescoping waterway is fully extended.

In one unillustrated alternative arrangement of the interlock that can be used to implement the logic outlined in FIG. 15, the interlock can take the form of a pneumatic or hydraulic input piston that is normally extended by a spring-return. The input piston is mounted to the outer tube of the telescoping waterway and located such that the input piston is only retracted when the telescoping waterway is in the fully extended position. The input piston is coupled via tubing to an output piston as a closed system. Fluid is supplied to opposite sides of the two pistons, such that both pistons are simultaneously fully extended or fully retracted. A sprocket with a circular pattern of holes is fastened to the input shaft by a means that can resist shaft torque, such as a rectangular prismatic key that engages keyways in the shaft and sprocket. The output piston is located and oriented such that the plunger engages the next adjacent hole in the sprocket, thus interlocking the parts as the input shaft rotates in the direction that opens the valve. The holes are spaced such that the amount of rotation between adjacent holes will keep the valve in a fully closed condition, though it allows the position of the moving valve element to change slightly.

In another unillustrated arrangement of an interlock that can be used to implement the logic outlined in FIG. 15, the interlock can take the form of a mechanical linkage that is normally extended by a spring-return. An input switch is mounted to the outer tube of the telescoping waterway and located such that the switch is only retracted when the telescoping waterway is in the fully extended position. The switch is coupled to an output mechanical link or plunger via an entirely mechanical system, such as hinged links or a push/pull cable. The input and output links or plungers are oriented such that both will be simultaneously fully extended or fully retracted. A sprocket with a circular pattern of holes is fastened to the input shaft by a means that can resist shaft torque, such as a rectangular prismatic key that engages keyways in the shaft and sprocket. The output link or plunger is located and oriented such that this component engages the next adjacent hole in the sprocket, thus interlocking the parts as the input shaft rotates in the direction that opens the valve. Again, the holes are spaced such that the amount of rotation between adjacent holes will keep the valve in a fully closed condition, though it allows the position of the moving valve element to change slightly.

Each of these alternative embodiments precludes an operator from opening the waterway valve if the telescoping waterway is not fully extended.

Various types of switches can be used to sense position and provide the required feedback, such as the many kinds of momentary switches discussed below, or a solid state sensor, such as a hall effect sensor.

In another unillustrated arrangement of an interlock that can be used to implement the logic outlined in FIG. 19, the momentary input switch can take the form of a pneumatic or hydraulic input piston that is normally extended by a spring-return. This piston is only retracted when the waterway valve is in the fully closed position. The input piston is coupled via tubing to an output piston as a closed system. Fluid is supplied to opposite sides of the two pistons, such that both pistons will be simultaneously fully extended or fully retracted. The output piston opens a normally closed valve, thus serving as the interlock device mentioned in FIG. 19 that supplies air pressure from the firefighting vehicle to the extend side of a pneumatic cylinder. The force from that cylinder extends the telescoping waterway.

In another unillustrated embodiment of an interlock that can be used to implement the logic of FIG. 19, the momentary input switch can take the form of a mechanical link or plunger that is normally extended by a spring-return. This link or plunger is only retracted when the waterway valve is in the fully closed position. The link or plunger is coupled to an output mechanical link or plunger via an entirely mechanical system, such as hinged links or a push/pull cable. The input and output links or plungers are oriented such that both are simultaneously fully extended or fully retracted. The output link or plunger opens a normally closed valve, thus supplying air pressure from the firefighting vehicle to the extend side of a pneumatic cylinder (89) as in FIG. 22 that extends the telescoping waterway.

In yet another embodiment of an interlock that can be used to implement using the logic of FIG. 19, the momentary input switch can take the form of a reed switch (as in FIG. 20) or a limit switch (as in FIG. 21) that is joined in a series circuit with an on/off operator switch that is connected to the input of an electrical relay. The electrical relay could be omitted if both switches had sufficient electrical current ratings to drive the output load without damage. Otherwise, the output of the relay is connected to a normally extended solenoid that locks a manually operated latch into a position that cannot be manually unlatched. This latch between the inner tube and outer tube is normally in a latch-ready state due to spring force, and automatically engages when the inner tube of the telescoping waterway is fully extended position. When both the momentary electrical input switch and the operator switch are triggered, the circuit is closed and causes the solenoid to retract, enabling the operator to manually disengage the latch and manually retract the telescoping waterway.

In one more embodiment of an interlock that can be used to implement using the logic of FIG. 19, the momentary input switch can take the form of a pneumatic or hydraulic input piston that is normally extended by a spring-return. The piston is only retracted when the waterway valve is in the fully closed position. The input piston is coupled via tubing to an output piston as a closed system. The fluid is supplied to opposite sides of the two pistons, such that both pistons are simultaneously fully extended or fully retracted. The output piston locks a manually operated latch into a position that cannot be manually unlatched. This latch between the inner tube and outer tube is normally in a latch-ready state due to spring force, and automatically engages when the inner tube of the telescoping waterway is fully extended. When both the valve position limit switch and the operator switch are triggered, the circuit is closed and causes the solenoid to retract, enabling the operator to manually disengage the latch and manually retract the telescoping waterway.

In still one more embodiment of an interlock that can be used to implement the logic of FIG. 19, the momentary input switch can take the form of a mechanical link or plunger that is normally extended by a spring-return. The link or plunger is only retracted when the waterway valve is in the fully closed position. The link or plunger is coupled to an output mechanical link or plunger via an entirely mechanical system, such as hinged links or a push/pull cable. The input and output links or plungers are oriented such that both are simultaneously fully extended or fully retracted. The output link or plunger locks a manually operated latch into a position that cannot be manually unlatched. This latch between the inner tube and outer tube is normally in a latch-ready state due to spring force, and automatically engages when the inner tube of the telescoping waterway is fully extended position. When both the valve position limit switch and the operator switch are triggered, the circuit is closed and causes the solenoid to retract, enabling the operator to manually disengage the latch and manually retract the telescoping waterway.

Each of these last arrangements enable an operator to retract the telescoping waterway only if the waterway valve is in the fully closed position.

The invention claimed is:

1. A telescoping waterway component that is for use in firefighting equipment and has:

a manifold that forms part of a waterway and is arranged to control a flow of fluid through the waterway;

a rotating shutoff element that rotates about an axis with respect to the manifold between a) an open position and b) a closed position in which the rotating shutoff element blocks the waterway and leaves a hollow cross-section within the manifold; and a telescoping inner tube that forms part of the waterway and moves between a) an extended position and b) a retracted position in which at least a portion of the inner tube nests within the hollow cross-section left within the manifold when the rotating shut-off element is in the closed position.

2. The telescoping waterway component of claim 1, that also has a valve interlock that disables an operator from rotating the shutoff element when inner tube is not in the extended position.

3. The telescoping waterway component of claim 1, that also has a waterway interlock that disables an operator from retracting the telescoping waterway when the rotating shut-off element is not in the closed position.

4. The telescoping waterway component of claim 1, that also has:

a switch that is only triggered when the inner tube is in a fully extended position; and an interlock device that is arranged to disable an operator from opening the valve when the momentary switch is not triggered.

5. The telescoping waterway component of claim 1, that also has:

a switch that is only triggered when the rotating shutoff element is in a fully closed position; and an interlock device that is arranged to disable an operator from retracting the waterway when the momentary switch is not triggered.

6. The telescoping waterway component of claim 1, in which the manifold has a pair of opposed openings, at least one of the openings being configured to serve as or connect to a connection inlet through which fluid enters the manifold, another of the openings being configured to connect to an outer tube through which the inner tube moves, and at least one of the openings being configured to provide an alternate connection point that enables the connection inlet to be selectively positionable at different inlet angles with respect to the waterway.

7. The telescoping waterway component of claim 1, in which the manifold has an opening that connects to an outer tube component that forms part of the waterway and is comprised of multiple segments that can be connected in different orientations, enabling the manifold to be selectively positionable at different inlet heights along the waterway.

8. A telescoping waterway component that is for use in firefighting equipment and has:

an outer tube that forms part of waterway through which firefighting fluid flows; an inlet component that is arranged to enable a flow of fluid into the waterway, is selectively positionable at different inlet angles with respect to the waterway, and has a rotating shutoff element that rotates about an axis with respect to the inlet component between a) an open position and b) a closed position in which the rotating shutoff element blocks the waterway and leaves a hollow cross-section within the inlet component; and a telescoping inner tube that forms part of the waterway and moves between a) an extended position downstream of the inlet component and b) a retracted position in which the telescoping inner tube nests within the hollow cross-section left within the inlet component when the rotating shut-off element is in the closed position.

9. A telescoping waterway component that is for use in firefighting equipment and has:

an outer tube that forms part of a waterway through which firefighting fluid flows;

an inlet component that is arranged to enable a flow of fluid into the waterway, is selectively positionable at different inlet heights along the waterway, and has a rotating shutoff element that rotates about an axis with respect to the inlet component between a) an open position and b) a closed position in which the rotating shutoff element blocks the waterway and leaves a hollow cross-section within the inlet component; and a telescoping inner tube that nests within the hollow cross-section left within the inlet component when the rotating shut-off element is in the closed position.

* * * * *